United States Patent
Hidai et al.

(10) Patent No.: US 11,767,076 B2
(45) Date of Patent: Sep. 26, 2023

(54) STRADDLED VEHICLE

(71) Applicant: YAMAHA HATSUDOKI KABUSHIKI KAISHA, Iwata (JP)

(72) Inventors: Atsuya Hidai, Shizuoka (JP); Hisatoshi Kinoshita, Shizuoka (JP); Kazuteru Iwamoto, Shizuoka (JP); Atsushi Hirano, Shizuoka (JP); Tatsuya Kasahara, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/827,999

(22) Filed: May 30, 2022

(65) Prior Publication Data

US 2022/0388594 A1 Dec. 8, 2022

(30) Foreign Application Priority Data

May 31, 2021 (JP) .................................. 2021-091961

(51) Int. Cl.
| | |
|---|---|
| *F02M 25/08* | (2006.01) |
| *B62J 37/00* | (2006.01) |
| *B60K 15/035* | (2006.01) |
| *B62K 11/14* | (2006.01) |
| *B62J 35/00* | (2006.01) |
| *B62J 45/41* | (2020.01) |

(52) U.S. Cl.
CPC ............... *B62K 11/14* (2013.01); *B62J 35/00* (2013.01); *B62J 37/00* (2013.01); *B62J 45/41* (2020.02); *F02M 25/089* (2013.01); *F02M 25/0818* (2013.01); *B60K 2015/03514* (2013.01)

(58) Field of Classification Search
CPC . B60K 2015/03514; B62J 35/00; B62J 37/00; F02M 25/0818; F02M 25/089
USPC .................................................. 123/518, 519
See application file for complete search history.

(56) References Cited

U.S. PATENT DOCUMENTS

| | | | |
|---|---|---|---|
| 2006/0037584 A1 | 2/2006 | Imamura | |
| 2010/0252554 A1 | 10/2010 | Eguchi et al. | |
| 2013/0062135 A1 | 3/2013 | Saitoh | |
| 2014/0060955 A1* | 3/2014 | Kono | F02M 35/024 180/291 |
| 2016/0009329 A1 | 1/2016 | Tsubone et al. | |

(Continued)

FOREIGN PATENT DOCUMENTS

WO 2020184226 A1 9/2020

*Primary Examiner* — Erick R Solis

(74) *Attorney, Agent, or Firm* — Rabin & Berdo, P.C.

(57) ABSTRACT

A vehicle includes at least one of an electric vent valve configured to open and close an outside-air-introduction passage of a canister or an electric suction pump configured to suck gas in a gas passage through which the gas flows. The canister and at least one of the vent valve or the suction pump are disposed such that at least one of a virtual-left-right-center plane that includes a center in a left-right direction and is perpendicular to the left-right direction, a virtual-front-rear-center plane that includes a center in a front-rear direction and is perpendicular to the front-rear direction, or a virtual-up-down-center plane that includes a center in an up-down direction and is perpendicular to the up-down direction is located between a gravity center of the canister and at least one of a gravity center of the vent valve or a gravity center of the suction pump.

4 Claims, 17 Drawing Sheets

(56) References Cited

U.S. PATENT DOCUMENTS

| | | | |
|---|---|---|---|
| 2016/0010599 A1* | 1/2016 | Tsubone | F02M 25/0854 |
| | | | 123/520 |
| 2016/0245237 A1 | 8/2016 | Ono et al. | |
| 2018/0179992 A1 | 6/2018 | Morita et al. | |
| 2019/0329647 A1 | 10/2019 | Takata et al. | |
| 2019/0381880 A1* | 12/2019 | Kamiyama | B60K 15/0406 |
| 2020/0018247 A1 | 1/2020 | Shinagawa et al. | |
| 2020/0102899 A1 | 4/2020 | Andrzejewski et al. | |
| 2020/0317045 A1* | 10/2020 | Watanabe | B60K 15/03504 |
| 2021/0003101 A1 | 1/2021 | Edwards et al. | |
| 2021/0262418 A1 | 8/2021 | Kawanishi et al. | |

\* cited by examiner

STRADDLED VEHICLE

TECHNICAL FIELD

The present teaching relates to a straddled vehicle.

BACKGROUND ART

A straddled vehicle, such as a motorcycle or the like, that uses an engine as a power source includes, in order to suppress discharge of evaporated fuel generated by evaporation of fuel in a fuel tank to atmosphere, an evaporative emission system that collects the evaporated fuel. The evaporative emission system includes a canister connected to the fuel tank and an intake passage of the engine by a purge pipe. The evaporative emission system is configured to cause activated carbon in the canister to absorb the evaporated fuel that has flowed in the canister from the fuel tank via the purge pipe. The evaporative emission system discharges the evaporated fuel absorbed by the activated carbon to the intake passage of the engine with outside air taken from an outside air introduction hole of the canister. The evaporated fuel discharged to the intake passage of the engine from the evaporative emission system is combusted in the engine.

In the canister, a volume necessary for collecting the evaporated fuel by the activated carbon is determined based on a volume of the fuel tank, a generation amount of evaporated fuel that is calculated from an area of a liquid surface of fuel, or the like. Therefore, the volume of the canister increases as the volume of the fuel tank, the area of the liquid surface of the fuel, or the like increases. The straddled vehicle, such as a motorcycle or the like, includes many components, such as an engine, an auxiliary machine for the engine, or the like, mounted in a limited space. The canister is mounted in the limited space of the straddled vehicle with the other components while the volume enough to allow collection of the evaporated fuel is ensured. For example, in Patent Document 1, a straddled vehicle in which a canister is disposed between a vehicle body frame and an engine and above a fuel pump is disclosed. The canister is fixed to the vehicle body frame via a common supporting member shared with the fuel pump. In the straddled vehicle described in Patent Document 1, the canister and the fuel pump are disposed one above the other near the engine, so that components of a fuel system can be compactly disposed.

CITATION LIST

Patent Document

Patent Document 1: International Patent Publication No. WO2020/184226

SUMMARY OF INVENTION

Problems to be Solved by Invention

In the evaporative emission system, airtightness needs to be ensured so that the evaporated fuel does not leak to the outside. Therefore, in the straddled vehicle, it is required to regularly perform a leak inspection to check whether the evaporative emission system has airtightness at a degree that can prevent the evaporated fuel from leaking to the outside. The airtightness of the evaporated emission system is determined based on a pressure value in a gas passage of the evaporative emission system when gas in the gas passage is sucked, for example, in a state where an outside-air-introduction passage is closed.

In the straddled vehicle, in order to perform an inspection for a leak of gas from the evaporative emission system, parts, such as a vent valve that shuts off the outside-air-introduction passage, a suction pump that sucks the gas in the gas passage, or the like, that have a certain amount of volume and a certain amount of weight need to be further mounted. However, in the straddled vehicle, various components are disposed in a limited space such that mass concentrates with suitable weight balance. Therefore, in a case where a part that is a heavy load and is used for performing an inspection for a leak of gas from the evaporative emission system is added in a vacant space of the straddled vehicle, there is a probability that the weight balance of the straddled vehicle is biased. On the other hand, in a case where the part is disposed in the straddled vehicle in consideration of the weight balance of the straddled vehicle, there is a probability that the space in the straddled vehicle cannot be effectively used.

It is therefore an object of the present teaching to provide a straddled vehicle on which a part used for performing an inspection for a leak of gas from an evaporative emission system is mounted such that a weight balance of the straddled vehicle is maintained while a space in the straddled vehicle is efficiently used.

Solution to Problem

Inventors of the present teaching conducted studies on a straddled vehicle on which a part used for performing an inspection for a leak of gas from an evaporative emission system is mounted such that a weight balance of the straddled vehicle is maintained while a space in the straddled vehicle is efficiently used. Through the intensive studies, the inventors of the present teaching have reached the following configuration.

A straddled vehicle according to one embodiment of the present teaching includes a front wheel, a rear wheel, a handlebar configured to steer the front wheel, an engine body configured to drive the front wheel or the rear wheel, a fuel tank configured to store fuel for the engine body, and an evaporative emission system configured to collect evaporated fuel generated in the fuel tank by a canister, introduce outside air to the canister from an outside-air-introduction passage through which the outside air is introduced, and discharge the collected evaporated fuel and the introduced outside air to an intake passage of the engine body from the canister. The straddled vehicle is configured such that a width of the handlebar in a left-right direction is smaller than a length between a front end of the front wheel and a rear end of the rear wheel in a front-rear direction and a height between an upper end of the handlebar and a lower end of the front wheel in an up-down direction. The evaporative emission system includes at least one of an electric vent valve configured to switch between a closed state in which the outside-air-introduction passage is closed and an open state where the outside-air-introduction passage is opened or an electric suction pump configured to suck gas in a gas passage that includes the outside-air-introduction passage and through which gas including at least one of the evaporated fuel or the outside air flows in the evaporative emission system.

The canister and at least one of the vent valve or the suction pump are disposed such that at least one of a virtual-left-right-center plane that is a virtual plane that includes a center of the handlebar in the left-right direction and is perpendicular to the left-right direction, a virtual-front-rear-center plane that is a virtual plane that includes a center between the front end of the front wheel and the rear end of the rear wheel in the front-rear direction and is perpendicular to the front-rear direction, or a virtual-up-down-center plane that is a virtual plane that includes a center between the upper end of the handlebar and the lower end of the front wheel in the up-down direction and is perpendicular to the up-down direction in the straddled vehicle is located between a gravity center of the canister and at least one of a gravity center of the vent valve or a gravity center of the suction pump. Alternatively, the canister and at least one of the vent valve or the suction pump are located such that each of intervals between gravity centers in the left-right direction, the front-rear direction, and the up-down direction is shorter than the width of the handlebar in the left-right direction.

In the configuration described above, the canister and at least one of the vent valve or the suction pump are disposed in a dispersed manner such that at least one of the virtual-left-right-center plane, the virtual-front-rear-center plane, or the virtual-up-down-center plane in the straddled vehicle is located between the gravity center of the canister and at least one of the gravity center of the vent valve or the gravity center of the suction pump. Moreover, a volume of each of the canister and at least one of the vent valve or the suction pump is smaller than a volume of each of the canister and at least one of the vent valve or the suction pump in a state where the canister and at least one of the vent valve or the suction pump are coupled to each other. Accordingly, the canister and at least one of the vent valve or the suction pump can be disposed using spaces between large-sized parts, such as a storage box, the engine body, an intake system component, a fuel system component, a brake hydraulic unit, or the like in the straddled vehicle. The canister and at least one of the vent valve or the suction pump are disposed such that the interval between the canister and at least one of the vent valve or the suction pump is shorter than the width of the handlebar in the left-right direction. As described above, by limiting the interval between the canister and at least one of the vent valve or the suction pump, a pipe volume of the evaporative emission system can be suppressed while the canister and at least one of the vent valve or the suction pump are disposed in a dispersed manner.

Therefore, a straddled vehicle on which a part used for performing an inspection for a leak of gas from an evaporative emission system is mounted such that the weight balance is maintained while a space in the straddled vehicle is efficiently used can be realized.

According to another aspect, the straddled vehicle of the present teaching preferably includes the following configuration. The canister is supported to the straddled vehicle by a first supporting member, and at least one of the vent valve or the suction pump is coupled to the straddled vehicle by a second supporting member that is different from the first supporting member.

In the configuration described above, at least one of the vent valve or the suction pump is coupled to the straddled vehicle by the second supporting member that is different from the first supporting member that couples the canister to the vehicle body, and the second supporting member that is different from the first supporting member is coupled to a different position from a position to which the first supporting member is coupled by the second supporting member that is different from the first supporting member in the vehicle body. Thus, the canister and at least one of the vent valve or the suction pump can be disposed such that each of the canister and at least one of the vent valve or the suction pump is located in a corresponding one of different spaces in the straddled vehicle. Accordingly, in the straddled vehicle, parts that are heavy loads among the parts used for performing an inspection for a leak of gas from the evaporative emission system can be disposed in a dispersed manner.

Therefore, a straddled vehicle on which a part used for performing an inspection for a leak of gas from an evaporative emission system is mounted such that the weight balance is maintained while a space in the straddled vehicle is efficiently used can be realized.

According to another aspect, the straddled vehicle of the present teaching preferably includes the following configuration. The evaporative emission system includes a pressure sensor configured to measure a pressure in the gas passage, and in a case where the evaporative emission system includes the vent valve, measures the pressure in the gas passage by the pressure sensor in a state where the outside-air-introduction passage is closed by the vent valve, in a case where the evaporative emission system includes the suction pump, and the suction pump is provided in the outside-air-introduction passage that is a portion of the gas passage, sucks the gas in the gas passage by the suction pump and measures the pressure in the gas passage by the pressure sensor, or in a case where the evaporative emission system includes the vent valve and the suction pump, sucks the gas in the gas passage by the suction pump, measures the pressure in the gas passage by the pressure sensor, and detects a leak of gas from the evaporative emission system in a state where the outside-air-introduction passage is closed by the vent valve.

In the configuration described above, in the straddled vehicle, a leak of the gas from the evaporative emission system is detected using the vent valve and the pressure sensor, the suction pump and the pressure sensor, or the vent valve, the pressure sensor, and the suction pump. Therefore, a leak of the gas from the evaporative emission system can be detected in a state where the vent valve or the suction pump that are heavy loads necessary for preforming an inspection for a leak of the gas from the evaporative emission system is mounted on the straddled vehicle such that the vent valve or the suction pump is efficiently disposed in a space in the straddled vehicle while the weight balance is maintained.

According to another aspect, the straddled vehicle of the present teaching preferably includes the following configuration. The canister includes a plurality of divided canisters connected in series or in parallel. At least one of the plurality of divided canisters and at least one of the vent valve or the suction pump are disposed such that at least one of the virtual-left-right-center plane that is a virtual plane that includes the center of the handlebar in the left-right direction and is perpendicular to the left-right direction, the virtual-front-rear-center plane that is a virtual plane that includes the center between the front end of the front wheel and the rear end of the rear wheel in the front-rear direction and is perpendicular to the front-rear direction, or the virtual-up-down-center plane that is a virtual plane that includes the center between the upper end of the handlebar and the lower end of the front wheel in the up-down direction and is perpendicular to the up-down direction in the straddled vehicle is located between at least one of gravity centers of the divided canisters and at least one of a gravity center of the vent valve or a gravity center of the suction pump.

Alternatively, at least one of the plurality of divided canisters and at least one of the vent valve or the suction pump are located such that each of intervals between the gravity centers in the left-right direction, the front-rear direction, and the up-down direction is shorter than the width of the handlebar in the left-right direction.

In the configuration described above, in a case where, as the canister, the plurality of divided canisters connected in series or in parallel are employed, an area exclusively used for a canister single body having a large volume among the parts used for an inspection for a leak of the gas from the evaporative emission system can be reduced. Accordingly, at least one of the vent valve or the suction pump and the divided canisters can be disposed in the straddled vehicle effectively using spaces in the straddled vehicle while the weight balance is maintained.

Therefore, a straddled vehicle on which a part used for performing an inspection for a leak of gas from an evaporative emission system is mounted such that the weight balance is maintained while a space in the straddled vehicle is efficiently used can be realized.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification specify the presence of stated features, steps, operations, elements, components, and/or their equivalents, but do not preclude the presence or addition of one or more other steps, operations, elements, components, and/or groups thereof.

As used herein, the terms "mounted," "connected," "coupled," and/or their equivalents thereof are used broadly and encompass both "direct and indirect" mounting, connecting, and coupling. Furthermore, "connected" and "coupled" are not restricted to physical or mechanical connections or couplings, and can include direct or indirect electrical connections or couplings.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the present teaching, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In this specification, embodiments of a straddled vehicle according to the present teaching will be described.

In the following description, for purposes of explanation, numerous specific details are set forth in order to provide a thorough understanding of the present teaching. It will be evident, however, to one skilled in the art that the present teaching may be practiced without these specific details.

The present disclosure is to be considered as an exemplification of the present teaching, and is not intended to limit the present teaching to the specific embodiments illustrated by the figures or description below.

[Straddled Vehicle]

As used herein, the term "straddled vehicle" refers to a vehicle on which a rider rides in a state in which the rider straddles a seat and sits on the seat. Accordingly, the straddled vehicle is not limited to a two-wheeled vehicle and examples of the straddled vehicle include vehicles, such as three-wheeled vehicles, four-wheeled vehicles, or the like, if the straddled vehicle is a vehicle on which a rider straddles and sits on the seat. The straddled vehicle may be a single-passenger vehicle or a vehicle on which a plurality of passengers can ride. Moreover, examples of the straddled vehicle include a scooter on which a rider sits on a seat without straddling the seat.

[Engine Body]

As used herein, the term "engine body" includes not only an engine but also a transmission connected to the engine, a part, such as an auxiliary machine or the like supported by the engine, or the like.

[Intake System Component]

As used herein, the term "intake system component" refers to a part forming an intake system of an engine. Examples of the intake system component include, for example, an intake duct, an air cleaner, a joint, a throttle body, an intake manifold, or the like.

[Fuel System Component]

As used herein, the term "fuel system component" refers to a part forming a fuel system that supplies fuel to an engine. Examples of the fuel system component include, for example, a fuel tank, a fuel pump, a fuel pipe, an injection, or the like.

[Storage Box]

As used herein, the term "storage box" means a member that can store an item, such as, for example, a helmet, a baggage, or the like. Examples of the storage box include, for example, an under-seat box located under a seat, a helmet box that stores a helmet, a baggage storage box that stores a baggage, or the like.

[Parts are Supported Independently from Each Other]

As used herein, by the term "parts are supported independently from each other," for example, it is meant that one and the other of the parts are coupled to a vehicle by different supporting members. "Parts are supported independently from each other" includes a case where the parts are coupled to a vehicle in a state where the both parts are separated from each other or in a state where the both parts are in contact with each other.

[Evaporated Fuel]

As used herein, the term "evaporated fuel" means fuel generated by evaporation of hydrocarbon fuel, such as gasoline, light oil, or the like, that is fuel for a straddled vehicle due to an influence of atmospheric temperature and atmospheric pressure.

[Left-Right Direction of Straddled Vehicle]

As used herein, a left-right direction of a straddled vehicle means a left-right direction when the straddled vehicle is viewed from a rider who drives the straddled vehicle in an upright state of the straddled vehicle.

[Front-Rear Direction of Straddled Vehicle]

As used herein, a front-rear direction of a straddled vehicle means a front-rear direction when the straddled vehicle is viewed from a rider who drives the straddled vehicle in an upright state of the straddled vehicle.

[Up-Down Direction of Straddled Vehicle]

As used herein, an up-down direction of a straddled vehicle means an up-down direction when the straddled vehicle is viewed from a rider who drives the straddled vehicle in an upright state of the straddled vehicle.

[Gas Passage]

As used herein, the term "gas passage" means a space through which at least one of evaporated fuel or outside air passes in the evaporative emission system. The term "gas passage" means a space in a parge pipe that couples the fuel tank and the canister and is located in an upstream side of the canister, a space in the canister, and respective spaces in a parge pipe that couples the canister and an intake pipe of the engine and is located in a downstream side of the canister, in a parge pipe that is an outside-air-introduction passage through which outside air is introduced, and in a valve in which gas passes.

Advantageous Effects of Invention

One embodiment of the present teaching realizes a straddled vehicle on which a part used for performing an inspection for a leak of gas from an evaporative emission system is mounted such that a weight balance is maintained while a space in the straddled vehicle is efficiently used.

DESCRIPTION OF EMBODIMENTS

Figure 1:
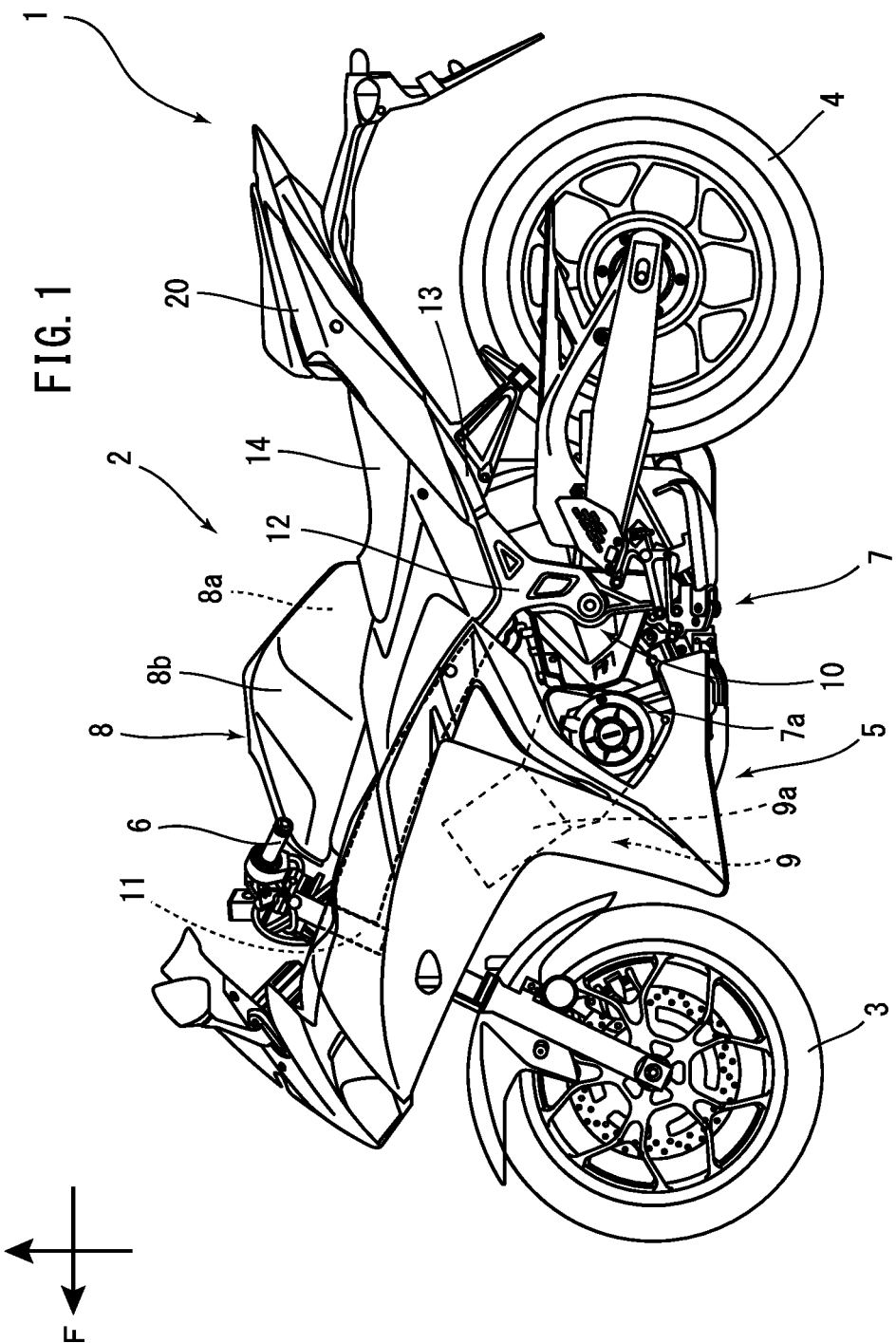
FIG. 1 is a side view illustrating an outline of an entire configuration of a straddled vehicle according to a first embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components, for example.

An arrow F in the accompanying drawings denotes a frontward direction of a vehicle. An arrow U in the accompanying drawings denotes an upward direction of the vehicle. An arrow L in the accompanying drawings denotes a leftward direction of the vehicle. An arrow R in the accompanying drawings denotes a rightward direction of the vehicle. In the following description, the front, rear, left, and right directions indicate front, rear, left, and right directions viewed from a driver driving the vehicle, respectively.

First Embodiment

<Entire Configuration of Straddled Vehicle>

Figure 2:
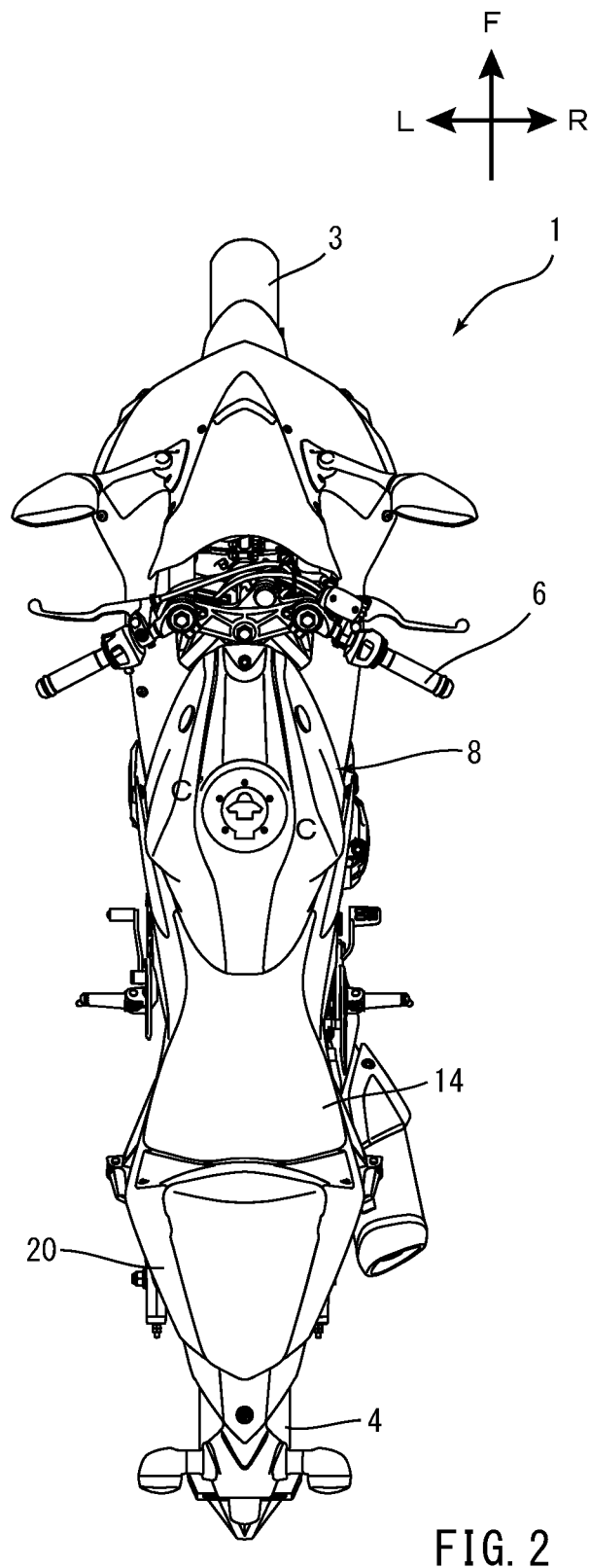
FIG. 2 is a plan view illustrating an outline of the entire configuration of the straddled vehicle according to the first embodiment of the present teaching.

With reference to FIG. 1 and FIG. 2, a vehicle 1 that is a straddled vehicle according to the present teaching will be described. FIG. 1 is a side view illustrating an outline of an entire configuration of the vehicle 1 according to an embodiment. FIG. 2 is a plan view illustrating the outline of the entire configuration of the vehicle 1 according to the embodiment. The vehicle 1 is, for example, a motorcycle and includes a vehicle body 2, a front wheel 3, and a rear wheel 4. The vehicle 1 turns in a leaning posture. That is, the vehicle 1 leans leftward when turning to left and leans rightward when turning to right.

The vehicle body 2 supports each of components, such as a vehicle body cover 5, a handlebar 6, a power unit 7, a fuel system 8, an intake system 9, a seat 14, a storage box 20, or the like. In this embodiment, the vehicle body 2 includes a frame 10 and supports each of components of the vehicle 1.

The frame 10 includes a head pipe 11, a main frame 12, and a seat rail 13.

The head pipe 11 is located in a front portion of the vehicle 1 and rotatably supports an unillustrated steering shaft connected to the handlebar 6 that steers the front wheel 3.

The main frame 12 is configured such that a front portion thereof is connected to the head pipe 11, and has a shape extending toward rear of the vehicle. A rear portion of the main frame 12 extends rearward and downward of the vehicle. The power unit 7 or the like is supported by the main frame 12, the power unit 7 including an engine body 7a that drives the front wheel 3 or the rear wheel 4 and a transmission (not illustrated).

A fuel tank 8b is fixed to an upper portion of the main frame 12. In the left-right direction of the vehicle 1, a portion of the vehicle body cover 5 that is an exterior part is fixed to at least a portion of a surface of the main frame 12. That is, a portion of the main frame 12 located under the fuel tank 8b is covered by the portion of the vehicle body cover 5. In this embodiment, a lower end portion and a rear end portion of the main frame 12 are exposed without being covered by the vehicle body cover 5 or the like. That is, at least a portion of the main frame 12 forms an outside surface of the vehicle 1 in the left-right direction.

The power unit 7 includes the engine body 7a. The engine body 7a is not specifically illustrated, but includes an engine, an engine auxiliary machine, and a transmission. Fuel is supplied to the engine from the fuel tank 8b. An intake pipe 9b (see FIG. 3) that is an intake passage through which sucked outside air passes is coupled to the engine.

The engine auxiliary machine is used to drive the engine and includes, for example, a fuel evaporator, an igniter, a starting device, or the like. The transmission is rotatably connected to a crankshaft of the engine. Each of configurations of the engine, the engine auxiliary machine, and the transmission is similar to a known configuration, and detailed description thereof will be thus omitted.

The fuel system 8 includes fuel system parts used for supplying fuel to the engine. Specifically, the fuel system 8 includes, for example, the fuel tank 8b, a fuel pump, a fuel pipe, an injection, or the like. Each of parts forming the fuel system 8 is a fuel system component 8a. The fuel system component 8a is not limited to the examples described above, if the fuel system component 8a is a part forming the fuel system 8.

The intake system 9 includes intake system parts used for introducing outside air to the engine. Specifically, the intake system 9 includes, for example, an air intake, an air cleaner, an intake duct, a joint, a throttle body, the intake pipe 9b, or the like. Each of parts forming the intake system 9 is an intake system component 9a. The intake system component 9a is not limited to the examples described above, if the intake system component 9a is a part forming the intake system 9.

The power unit 7 is fixed to a lower portion of the main frame 12. The intake pipe 9b (see FIG. 3) that is an intake passage is coupled to the engine body 7a.

As illustrated in FIG. 1, the seat rail 13 is connected to a rear end portion of the main frame 12. That is, the seat rail 13 extends from the rear end portion of the main frame 12 toward rear of the vehicle 1. The seat 14 that is located at a center of the vehicle 1 in the left-right direction and on which the rider sits is disposed above the seat rail 13. A portion of the vehicle body cover 5 is fixed to at least a portion of a surface of the seat rail 13. That is, at least a portion of the seat rail 13 is covered by the vehicle body cover 5.

The storage box 20 is disposed on periphery of the seat 14. The storage box 20 may be disposed, for example, under the seat 14 and may be disposed in front of or behind the seat 14. The storage box 20 may be configured to be able to store a helmet therein, and may be configured to be able to store a baggage or the like therein.

<Entire Configuration of Evaporative Emission System 30>

Figure 3:
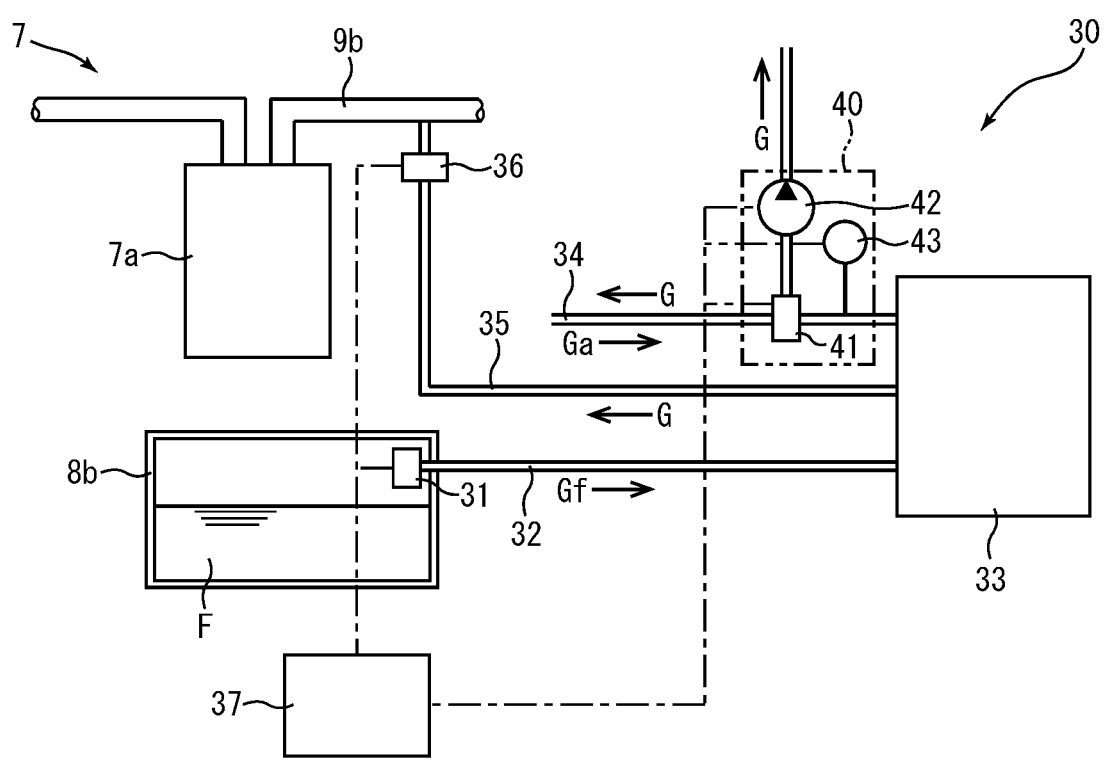
FIG. 3 is an outline block diagram of an evaporative emission system mounted on the straddled vehicle according to the first embodiment of the present teaching.

Next, an evaporative emission system 30 according to a first embodiment of an evaporative emission system mounted on the vehicle 1 of the present teaching will be described with reference to FIG. 3. FIG. 3 is an outline block diagram of the evaporative emission system 30 according to the first embodiment mounted on the straddled vehicle 1 according to the embodiment of the present teaching.

As illustrated in FIG. 3, the evaporative emission system 30 suppresses discharge of evaporated fuel Gf generated by evaporation of fuel F in the fuel tank 8b into atmosphere. The evaporative emission system 30 includes a shut-off valve 31, a first purge pipe 32, a canister 33, a vent pipe 34, a second purge pipe 35, a purge control valve 36, and a controller 37. Moreover, the evaporative emission system 30 includes a gas-leak-detection device 40.

The shut-off valve 31 is a switching valve that switches between a closed state where a gas passage through which gas G including at least one of the evaporated fuel Gf or outside air Ga flows is closed and an open state where the gas passage is opened. The shut-off valve 31 is, for example, an electromagnetic solenoid valve. The shut-off valve 31 is coupled to the fuel tank 8b that stores the fuel F that is supplied to the engine body 7a. In this embodiment, the shut-off valve 31 is located in the fuel tank 8b. One end portion of the first purge pipe 32 is connected to the shut-off valve 31 from outside of the fuel tank 8b.

The shut-off valve 31 switches between a closed state where the one end portion of the first purge pipe 32 is closed and an open state where the one end portion of the first purge pipe 32 is opened. In a case where the shut-off valve 31 is in the closed state, the evaporated fuel Gf in the fuel tank 8b does not flow in the first purge pipe 32. In a case where the shut-off valve 31 is in the open state, the evaporated fuel Gf in the fuel tank 8b passes in the shut-off valve 31 to flow in the first purge pipe 32. As described above, the shut-off valve 31 in which the evaporated fuel Gf flows forms a portion of the gas passage. The shut-off valve 31 may be positioned outside the fuel tank 8b. The shut-off valve 31 may be supported by some other part than the fuel tank 8b.

The first purge pipe 32 is a pipe through which the evaporated fuel Gf in the fuel tank 8b flows to the canister 33. The other end portion of the first purge pipe 32 is connected to the canister 33. That is, the first purge pipe 32 connects the shut-off valve 31 to the canister 33. The first purge pipe 32 is switched by the shut-off valve 31 between an open state where the evaporated fuel Gf in the fuel tank 8b flows and a closed state where the evaporated fuel Gf in the fuel tank 8b does not flow. The first purge pipe 32 in which the evaporated fuel Gf flows forms a portion of the gas passage.

The canister 33 is a fuel absorber that collects the evaporated fuel Gf and discharges the collected evaporated fuel Gf with the outside air Ga to the intake pipe 9b of the engine body 7a. The canister 33 includes a case 33a and unillustrated activated carbon that is an absorbent that absorbs the evaporated fuel Gf. The activated carbon is located in an inner space of the case 33a.

The other end portion of the first purge pipe 32 is connected to the canister 33. Thus, the evaporated fuel Gf in the fuel tank 8b flows in the canister 33 from the first purge pipe 32. The vent pipe 34 and the second purge pipe 35 are connected to the canister 33. The outside air Ga flows in the canister 33 from the vent pipe 34. As described above, the inner space of the canister 33 in which the evaporated fuel Gf and the outside air Ga flow forms a portion of the gas passage.

The vent pipe 34 is a pipe that discharges the gas G in the canister 33 to the atmosphere and introduces the outside air Ga to the canister 33. One end portion of the vent pipe 34 is connected to the canister 33. The other end portion of the vent pipe 34 is opened to the atmosphere. Thus, the vent pipe 34 can introduce the outside air Ga to the canister 33 from the other end portion. The vent pipe 34 can discharge the gas G after the evaporated fuel Gf has been absorbed by the activated carbon in the canister 33 to the atmosphere. The vent pipe 34 in which the gas G after the evaporated fuel Gf has been absorbed flows forms a portion of the gas passage.

The second purge pipe 35 is a pipe through which the gas G including the evaporated fuel Gf and the outside air Ga in the canister 33 flows to the intake pipe 9b of the engine body 7a. One end portion of the second purge pipe 35 is connected to the canister 33. The other end of the second purge pipe 35 is connected to the intake pipe 9b of the engine body 7a. Thus, the second purge pipe 35 can discharge the gas G in the canister 33 to the intake pipe 9b. The second purge pipe 35 through which the gas G flows forms a portion of the gas passage. The purge control valve 36 is provided in the second purge pipe 35.

The purge control valve 36 is a flow rate control valve that can continuously change an opening degree between a closed state where the second purge pipe 35 is closed and an open state where the second purge pipe 35 is opened. The purge control valve 36 is, for example, an electromagnetic proportional control valve. The purge control valve 36 is provided in an arbitrary position in the second purge pipe 35. The purge control valve 36 is coupled to a part forming the vehicle 1. The purge control valve 36 is coupled to, for example, the frame 10.

In a case where the purge control valve 36 is in the closed state, the gas G in the canister 33 is not discharged to the intake pipe 9b from the second purge pipe 35. In a case where the purge control valve 36 is not in the closed state, the gas G in the canister 33 passes through the purge control valve 36 and is discharged to the intake pipe 9b from the second purge pipe 35 at a flow rate proportional to the opening degree of the purge control valve 36. As described above, the purge control valve 36 through which the gas G flows forms a portion of the gas passage.

The controller 37 controls the evaporative emission system 30. The controller 37 is ECU that controls, for example, driving of the engine body 7a. The controller 37 is electrically connected to the shut-off valve 31 and the purge control valve 36. The controller 37 stores various types of programs and data in order to control the shut-off valve 31, the purge control valve 36, and the gas-leak-detection device 40. The controller 37 controls the shut-off valve 31 to switch the shut-off valve 31 between the closed state and the open state. The controller 37 performs control to continuously change the opening degree of the purge control valve 36 between the closed state and the open state. The controller 37 may be a separate body from ECU.

<Purge Operation of Evaporative Emission System>

In the evaporative emission system 30 configured in the above-described manner, in a case where the engine body 7a is not on operation, the controller 37 switches the shut-off valve 31 to the open state. Furthermore, the controller 37 switches the purge control valve 36 to the closed state. The evaporated fuel Gf generated in the fuel tank 8b flows in the canister 33 through the first purge pipe 32. The evaporated fuel Gf that has flowed in the canister 33 is absorbed by the activated carbon. The gas G after the evaporated fuel Gf has been absorbed is discharged to the atmosphere from the vent pipe 34.

In a case where the engine body 7a is in operation, the controller 37 switches the shut-off valve 31 to the closed state. Furthermore, the controller 37 changes the opening degree of the purge control valve 36 in accordance with an operation state of the engine body 7a. The gas G in the gas passage of the evaporative emission system 30 flows toward the intake pipe 9b due to reduction in pressure in the intake pipe 9b caused by operation of the engine body 7a. Thus, a pressure in the gas passage turns negative.

The evaporative emission system 30 introduces the outside air Ga to the canister 33 from the vent pipe 34 by the negative pressure in the gas passage. The outside air Ga that has flowed in the canister 33 is mixed with the evaporated fuel Gf absorbed by the activated carbon. The evaporative emission system 30 discharges the gas G in which the outside air Ga and the evaporated fuel Gf are mixed to the intake pipe 9b from the second purge pipe 35. In the evaporative emission system 30, the evaporated fuel Gf absorbed by the activated carbon is removed by the outside air Ga, so that a volume of the evaporated fuel Gf that can be collected by the activated carbon is increased.

<Configuration of Gas-Leak-Detection Device of Evaporative Emission System>

Next, with reference to FIG. 3, the gas-leak-detection device 40 of the evaporative emission system 30 will be described.

As illustrated in FIG. 3, the gas-leak-detection device 40 detects a leak of the gas G from the evaporative emission system 30. The gas-leak-detection device 40 is a gas-leak-detection device of a forced-negative-pressure type that detects a leak of the gas from the gas passage in a state where the pressure in the gas passage in the evaporative emission system 30 is forced to be negative.

The gas-leak-detection device 40 includes a vent valve 41, a suction pump 42, and a pressure sensor 43 that are parts used for performing an inspection for a leak of the gas G from the evaporative emission system 30.

The vent valve 41 is an electric valve that switches between a closed state where the vent pipe 34 that is an outside-air-introduction passage is closed and an open state where the vent pipe 34 is opened. The vent valve 41 is, for example, an electromagnetic solenoid valve. The vent valve 41 is provided in an arbitrary position in the vent pipe 34. The suction pump 42 is connected to the vent valve 41. In the closed state where the vent pipe 34 is closed, the vent valve 41 switches to a state where the suction pump 42 can suck the gas G in the gas passage. In the open state where the vent pipe 34 is opened, the vent valve 41 switches to a state where the suction pump 42 cannot suck the gas G in the gas passage. As described above, the vent valve 41 through which the gas G flows forms a portion of the gas passage.

In a case where the vent valve 41 is in the open state, the evaporative emission system 30 discharges the gas G that does not include the evaporated fuel Gf in the canister 33 to the atmosphere from the vent pipe 34. Moreover, in a case where the vent valve 41 is in the open state, the evaporative emission system 30 introduces the outside air Ga to the canister 33 from the vent pipe 34. In this case, the suction pump 42 is in a state where the suction pump 42 cannot suck the gas G in the gas passage.

In a case where the vent valve 41 is in the closed state, the evaporative emission system 30 does not discharge the gas G in the canister 33 to the atmosphere from the vent pipe 34. Moreover, in a case where the vent valve 41 is in the closed state, the evaporative emission system 30 does not introduce the outside air Ga to the canister 33 from the vent pipe 34. In this case, the suction pump 42 is in a state where the suction pump 42 can suck the gas Gin the gas passage. The vent valve 41 is electrically connected to the controller 37. Thus, the controller 37 can control the vent valve 41.

The suction pump 42 is an electric pump that sucks the gas G in the gas passage. The suction pump 42 is, for example, a rotary pump. The suction pump 42 is connected to the vent valve 41.

The suction pump 42 can suck the gas G in the gas passage in a case where the vent valve 41 is in the closed state. That is, the suction pump 42 causes the pressure in the gas passage to be negative. The suction pump 42 is electrically connected to the controller 37. Thus, the controller 37 can control the suction pump 42.

The pressure sensor 43 is a sensor that measures the pressure in the gas passage. The pressure sensor 43 is provided in any one of an arbitrary position in the first purge pipe 32, a position in the vent pipe 34 located closer to the canister 33 than the vent valve 41, the canister 33, or a position in the second purge pipe 35 located closer to the canister 33 than the purge control valve 36. The pressure sensor 43 measures the pressure in the gas passage. The pressure sensor 43 is electrically connected to the controller 37. Thus, the controller 37 can acquire measurement data from the pressure sensor 43.

<Detection of Leak from Evaporative Emission System>

In a case of detecting a leak of the gas G from the evaporative emission system 30, the controller 37 switches the shut-off valve 31, the purge control valve 36, and the vent valve 41 to the closed state. Thus, in the evaporative emission system 30, the gas passage is put in the closed state. Next, the controller 37 sucks the gas G in the gas passage by the suction pump 42. The controller 37 measures the pressure in the gas passage by the pressure sensor 43. If a measured value of the pressure sensor 43 is a reference value or more, the controller 37 determines that there is a probability that the gas G leaks from the gas passage of the evaporative emission system 30.

Next, with reference to FIG. 4 to FIG. 6 and FIG. 18, disposition of the gas-leak-detection device 40 of the evaporative emission system 30 in the vehicle 1 will be described. The gas-leak-detection device 40 includes at least one of the vent valve 41 or the suction pump 42. The canister 33 is supported to the frame 10 by a canister supporting member 33b (see FIG. 8) serving as a first supporting member. The vent valve 41 is supported to the frame 10 by a vent valve supporting member 41a (see FIG. 8) serving as a second supporting member. The suction pump 42 is supported to the frame 10 by a suction pump supporting member 42a (see FIG. 8) serving as another second supporting member. As described above, the canister 33, the vent valve 41, and the suction pump 42 are supported to the frame 10 by the different supporting members. That is, the canister 33, the vent valve 41, and the suction pump 42 are supported independently from each other.

Figure 4:
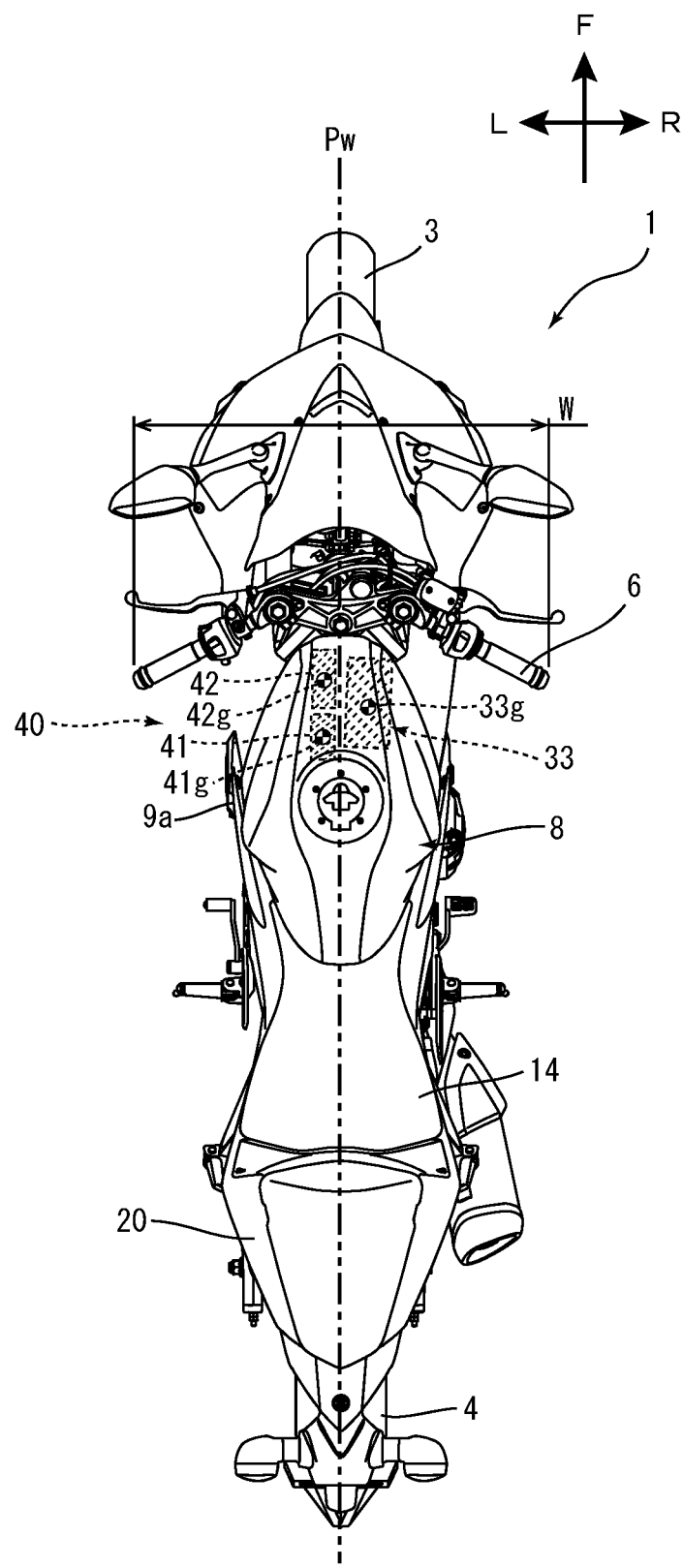
FIG. 4 is a plan view of the straddled vehicle illustrating a state where a canister is disposed to be separated from the gas-leak-detection device of the evaporative emission system according to the first embodiment in a left-right direction of the vehicle.
Figure 5:
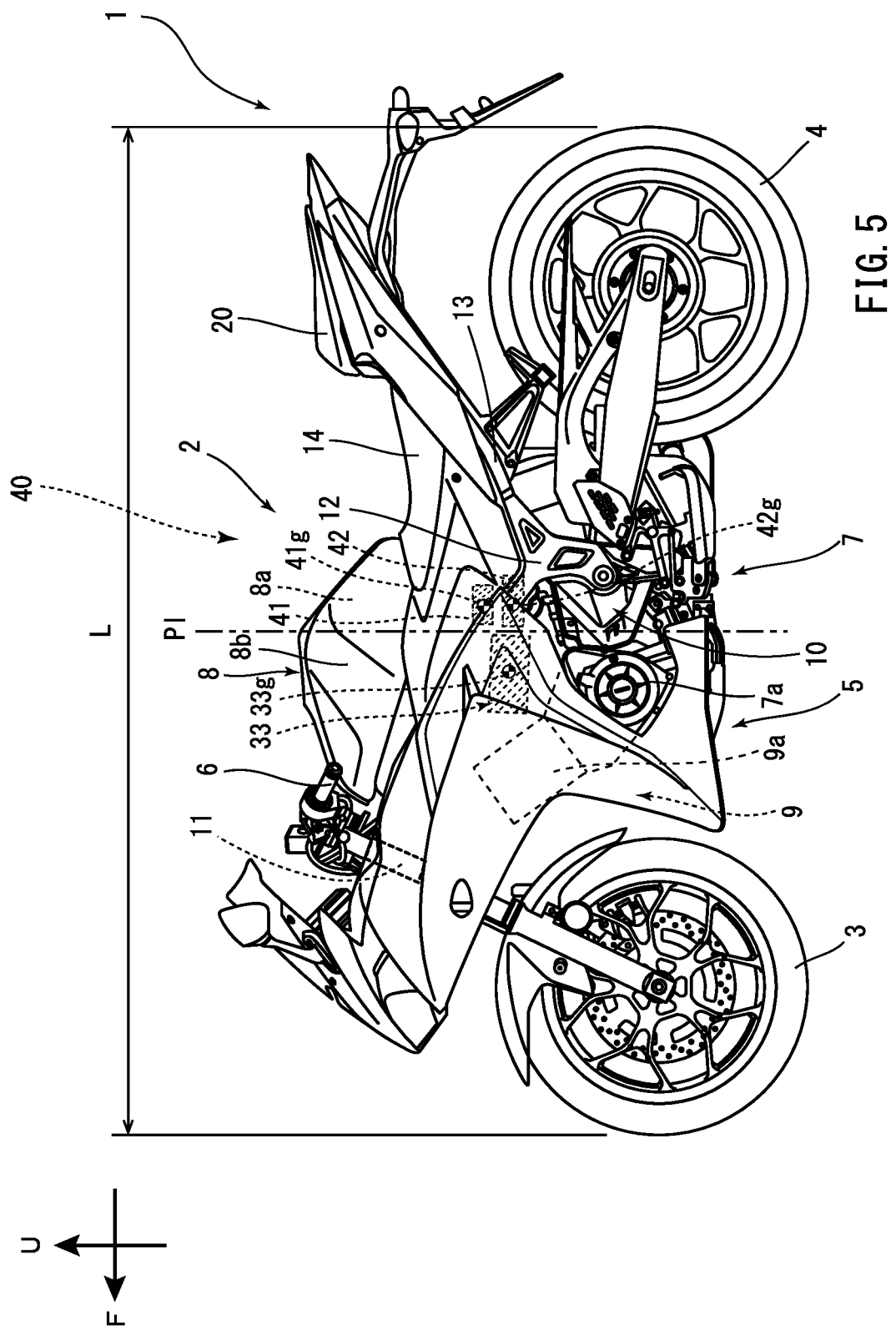
FIG. 5 is a side view of the straddled vehicle illustrating a state where the canister is disposed to be separated from the gas-leak-detection device of the evaporative emission system according to the first embodiment in a front-rear direction of the vehicle.
Figure 6:
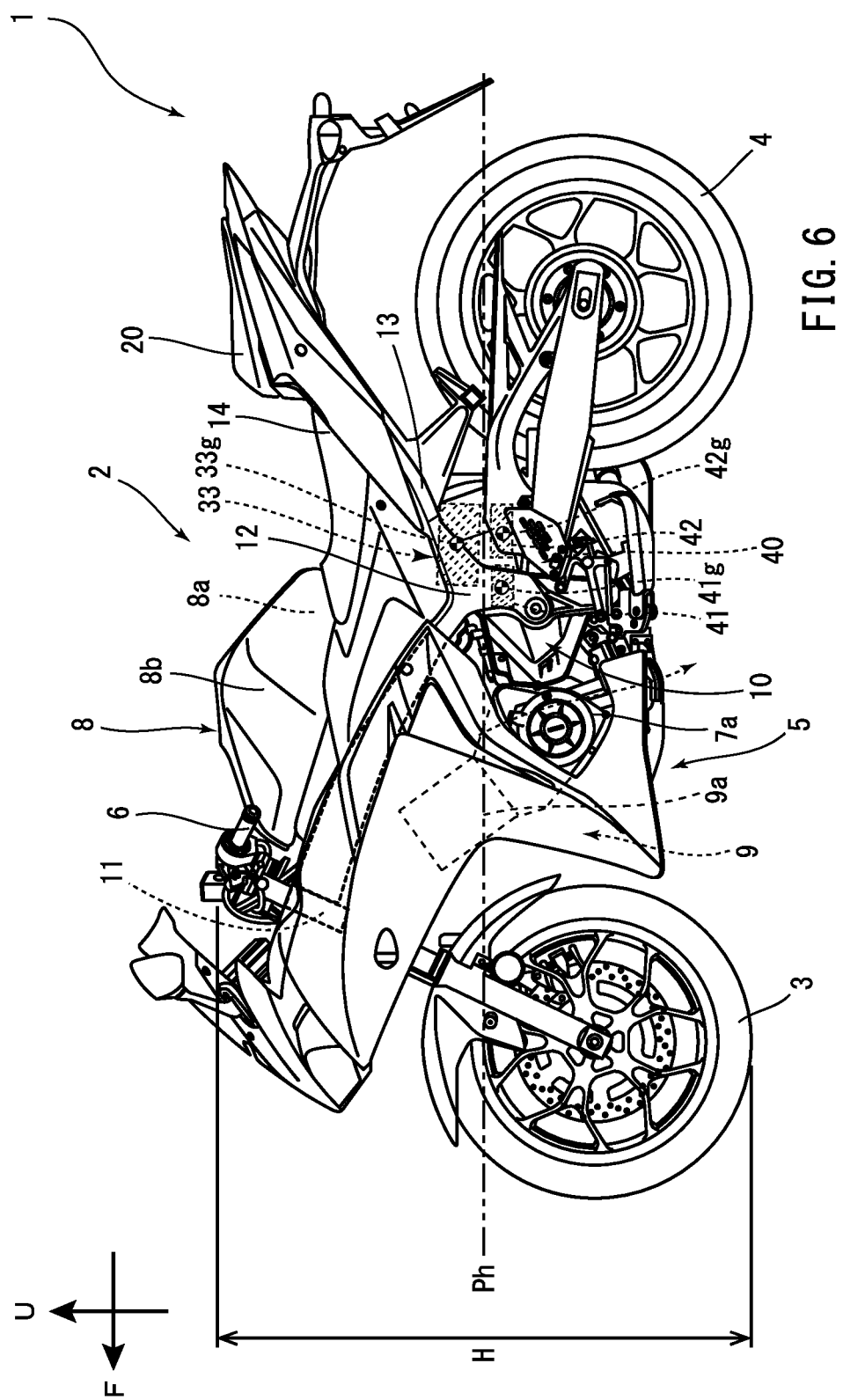
FIG. 6 is a side view of the straddled vehicle illustrating a state where the canister is disposed to be separated from the gas-leak-detection device of the evaporative emission system according to the first embodiment in an up-down direction of the vehicle.

FIG. 4 is a plan view of the vehicle 1 illustrating a state where the canister 33 is disposed to be separated from the gas-leak-detection device 40 of the evaporative emission system 30 in the left-right direction of the vehicle 1. FIG. 5 is a side view of the vehicle 1 illustrating a state where the canister 33 is disposed to be separated from the gas-leak-detection device 40 of the evaporative emission system 30 in the front-rear direction of the vehicle 1. FIG. 6 is a side view of the vehicle 1 illustrating a state where the canister 33 is disposed to be separated from the gas-leak-detection device 40 of the evaporative emission system 30 in the up-down direction of the vehicle 1.

Figure 18:
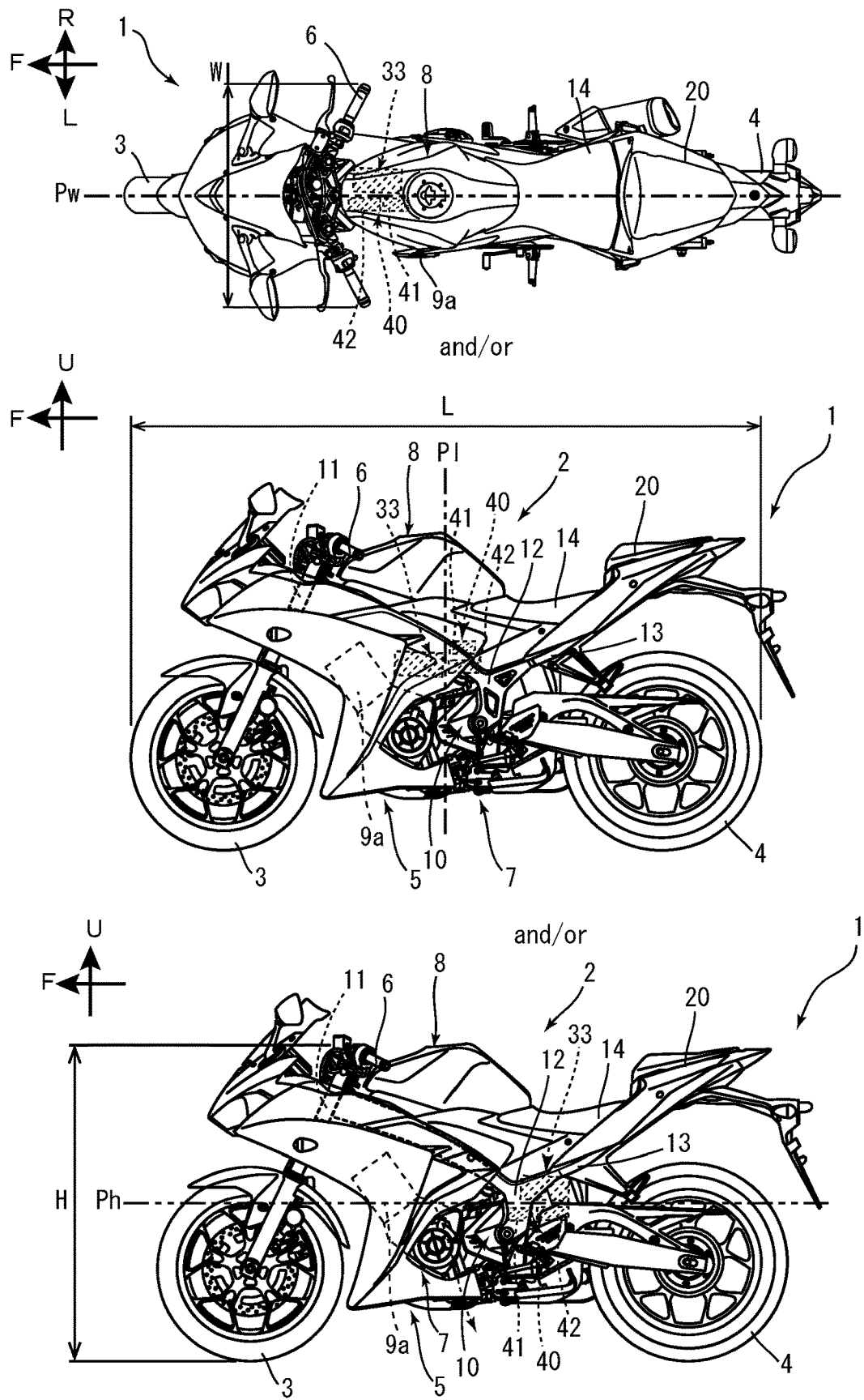
FIG. 18 illustrates a plan view and side views of a straddled vehicle according to the present teaching illustrating states where, in the straddled vehicle, at least one of a vent valve or a suction pump is disposed such that a gravity center of a canister is separated from a gravity center of the part at least in one of a left-right direction, a front-rear direction, or an up-down direction of the straddled vehicle.

As illustrated in FIG. 4 and FIG. 18, in order to maintain the weight balance while efficiently using at least a space in the vehicle 1 in the left-right direction, at least one of the vent valve 41 or the suction pump 42 that form a portion of the gas-leak-detection device 40 is disposed such that at least one of a gravity center 41G of the vent valve 41 or a gravity center 42g of the suction pump 42 is separated from a gravity center of the canister 33 in the left-right direction of the vehicle 1. The above-described parts and the canister 33 are individually supported to the vehicle 1 by different supporting members. Each of the canister 33, the vent valve 41, and the suction pump 42 is disposed in a corresponding space selected from a plurality of spaces in the vehicle 1 on which the above-described parts can be mounted.

In the embodiment illustrated in FIG. 4, the canister 33, and the vent valve 41 and the suction pump 42 are disposed in a dispersed manner in the left-right direction such that a virtual-left-right-center plane Pw that is a virtual plane that includes a center of a width W of the handlebar 6 in the left-right direction and is perpendicular to the left-right direction is interposed between the canister 33, and the vent valve 41 and the suction pump 42. The virtual-left-right-center plane Pw means a virtual plane that divides the vehicle 1 into a right space and a left space in the left-right direction in the vehicle 1 when the vehicle 1 is viewed in the up-down direction. The canister 33 is located such that a gravity center 33g of the canister 33 is included in a space under the fuel tank 8b and at right of the virtual-left-right-center plane Pw. The vent valve 41 and the suction pump 42 are located such that the gravity center 41g of the vent valve 41 and the gravity center 42g of the suction pump 42 are included in a space under the fuel tank 8b and at left of the virtual-left-right-center plane Pw. That is, the canister 33, and the vent valve 41 and the suction pump 42 are disposed such that the virtual-left-right-center plane Pw is located between the gravity center 33g of the canister 33, and the gravity center 41g of the vent valve 41 and the gravity center 42g of the suction pump 42.

A volume of each of the canister 33, the vent valve 41, and the suction pump 42 is smaller than a volume thereof in a state where the canister 33 is coupled with the at least one of the vent valve 41 and the suction pump 42. Accordingly, each of the canister 33, the vent valve 41, and the suction pump 42 is disposed using a space between the fuel tank 8b of the fuel system component 8a and the engine body 7a that are large-sized parts, or the like. Therefore, in this embodiment, the canister 33 and the vent valve 41 and the suction pump 42 forming a portion of the gas-leak-detection device 40 can be mounted on the vehicle 1 in a dispersed state using efficiently using at least a space in the vehicle 1 in the left-right direction. Thus, the weight balance can be maintained while at least the space of the vehicle 1 in the left-right direction can be efficiently used.

As illustrated in FIG. 5 and FIG. 18, in order to maintain the weight balance while efficiently using a space in the vehicle 1 in the front-rear direction, in a case where the gas-leak-detection device 40 is disposed, at least one of the vent valve 41 or the suction pump 42 that form a portion of the gas-leak-detection device 40 is disposed such that at least one of the gravity center 41g of the vent valve 41 or the gravity center 42g of the suction pump 42 is separated from the gravity center 33g of the canister 33 in the front-rear direction of the vehicle 1. The above-described parts and the canister 33 are supported individually supported to the vehicle body 2 by different supporting members. Each of the canister 33, the vent valve 41, and the suction pump 42 is disposed in a corresponding space selected from spaces in the vehicle 1 on which the above-described parts can be mounted.

In the embodiment illustrated in FIG. 5, the canister 33, and the vent valve 41 and the suction pump 42 are disposed in a dispersed manner such that a virtual-front-rear-center plane P1 that is a vertical virtual plane that includes a center of an entire length L between a front end of the front wheel 3 and a rear end of the rear wheel 4 in the front-rear direction and is perpendicular to the front-rear direction is interposed between the canister 33, and the vent valve 41 and the suction pump 42. The virtual-front-rear-center plane P1 means a virtual plane that divides the vehicle 1 into a front space and a rear space in the front-rear direction in the vehicle 1 when the vehicle 1 is viewed in the left-right direction. The canister 33 is located such that the gravity center 33g of the canister 33 is included in a space under the fuel tank 8b and in front of the virtual-front-rear-center plane P1. That is, the canister 33, and the vent valve 41 and the suction pump 42 are disposed such that the virtual-front-rear-center plane P1 is located between the gravity center 33g of the canister 33, and the gravity center 41g of the vent valve 41 and the gravity center 42g of the suction pump 42. The vent valve 41 and the suction pump 42 are located such that the gravity center 41g of the vent valve 41 and the gravity center 42g of the suction pump 42 are included in a space under the seat 14 and behind the virtual-front-rear-center plane P1.

As described above, the canister 33 and at least one of the vent valve 41 or the suction pump 42 are disposed using a space between large-sized parts, that is, between the fuel tank 8b of the fuel system component 8a and the seat 14 or the like. Therefore, in this embodiment, the canister 33 and the gas-leak-detection device 40 can be mounted on the vehicle 1 in a state where the canister 33 and the gas-leak-detection device 40 are dispersed efficiently using at least the space in the vehicle 1 in the front-rear direction. Thus, in this embodiment, the weight balance can be maintained while at least the space in the vehicle 1 in the front-rear direction is efficiently used.

As illustrated in FIG. 6 and FIG. 18, the canister 33, and the vent valve 41 and the suction pump 42 are disposed in a dispersed manner such that a virtual-up-down-center plane Ph that is a horizontal virtual plane that includes a center of a height H between an upper end of the handlebar 6 and a lower end of the front wheel 3 in the up-down direction and is perpendicular to the up-down direction is interposed between the canister 33, and the vent valve 41 and the suction pump 42. The virtual-up-down-center plane Ph means a virtual plane that divides the vehicle 1 into an upper space and a lower space in the up-down direction in the vehicle 1 when the vehicle 1 is viewed in the left-right direction. The canister 33 is located such that the gravity center 33g of the canister 33 is included in a space under the seat 14 and above the virtual-up-down-center plane Ph. That is, the canister 33, and the vent valve 41 and the suction pump 42 are disposed such that the virtual-up-down-center plane Ph is located between the gravity center 33g of the canister 33, and the gravity center 41g of the vent valve 41 and the gravity center 42g of the suction pump 42. The vent valve 41 and the suction pump 42 are located such that the gravity center 41g of the vent valve 41 and the gravity center 42g of the suction pump 42 are included in a space over the power unit 7 and below the virtual-up-down-center plane Ph.

As described above, the canister 33 and at least one of the vent valve 41 or the suction pump 42 are disposed using a space between large-sized parts, such as the seat 14 and the power unit 7 or the like. Therefore, in this embodiment, the canister 33 and the gas-leak-detection device 40 can be mounted on the vehicle 1 in a dispersed manner efficiently using at least the spaces in the vehicle 1 in the up-down direction. Thus, in this embodiment, the weight balance can be maintained while at least the space in the vehicle 1 in the up-down direction is efficiently used.

As illustrated in FIG. 4 to FIG. 6, the canister 33 and at least one of the vent valve 41 or the suction pump 42 that form a portion of the gas-leak-detection device 40 are located such that the gravity center 33g of the canister 33 is included in one of the spaces divided by the virtual-left-right-center plane Pw, the virtual-front-rear-center plane P1, or the virtual-up-down-center plane Ph in the vehicle 1, and at least one of the gravity center 41g of the vent valve 41 or the gravity center 42g of the suction pump 42 is included in the other one of the spaces. The canister 33 and at least one of the vent valve 41 or the suction pump 42 are individually supported to the frame 10 by different supporting members. That is, the canister 33 and at least one of the vent valve 41 or the suction pump 42 are located so as to be separated from each other independently in the corresponding spaces in the vehicle 1. As described above, the canister 33 and the vent valve 41 and the suction pump 42 that form a portion of the gas-leak-detection device 40 are disposed in a dispersed manner in the corresponding spaces selected from the plurality of spaces in the vehicle 1, so that the weight balance can be maintained while vacant spaces in the vehicle 1 in the left-right direction, the front-rear direction, and the up-down direction are efficiently used.

The canister 33 and at least one of the vent valve 41 or the suction pump 42 that form a portion of the gas-leak-detection device 40 may be disposed such that at least one of the virtual-left-right-center plane Pw, the virtual-front-rear-center plane P1, or the virtual-up-down-center plane Ph is located between the gravity center 33g of the canister 33 and at least one of the gravity center 41g of the vent valve 41 and the gravity center 42g of the suction pump 42.

Figure 7:
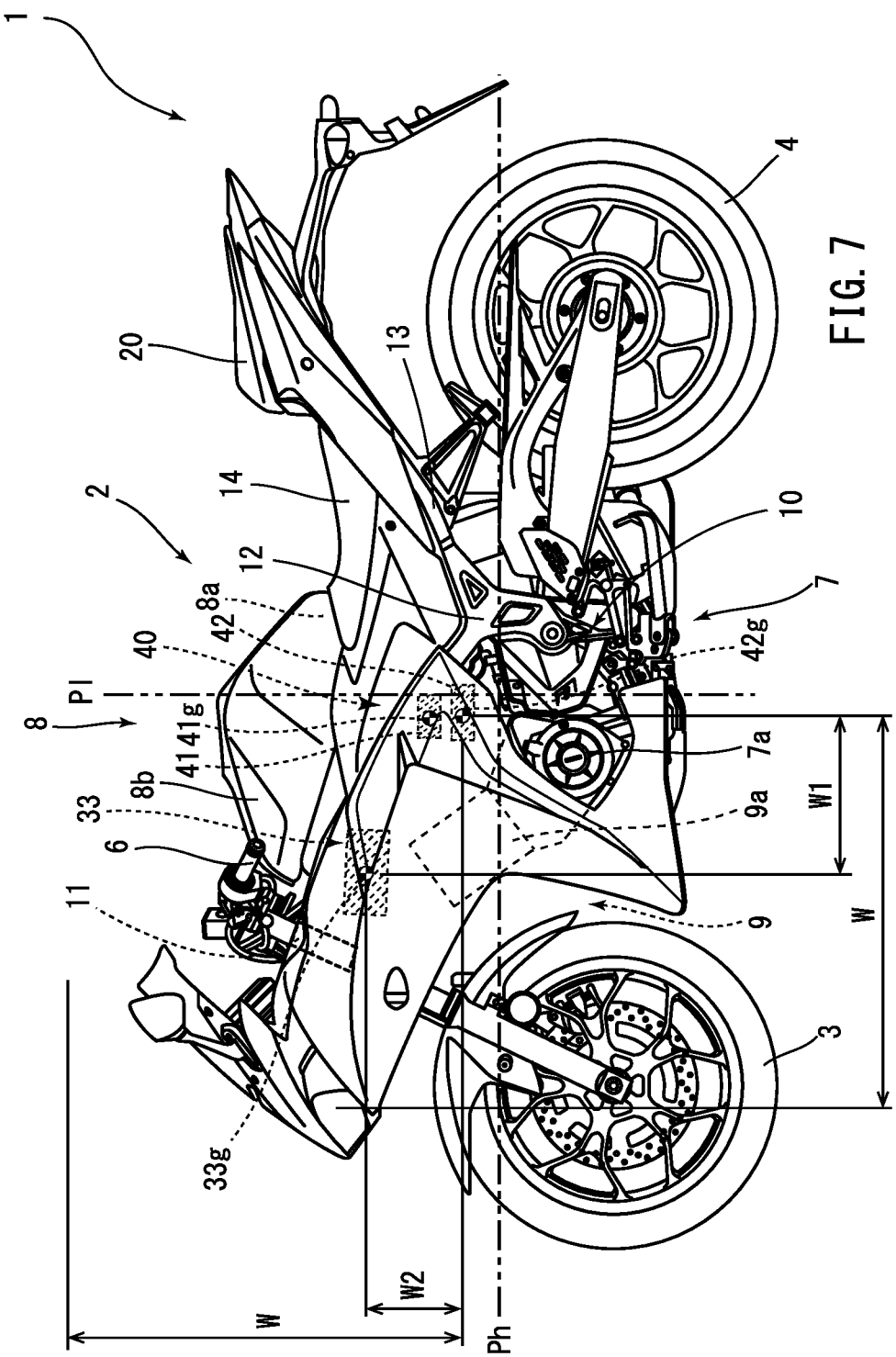
FIG. 7 is a side view of the straddled vehicle illustrating a state where the canister is disposed with respect to the gas-leak-detection device of the evaporative emission system according to the first embodiment with an interval shorter than a width of a handlebar therebetween.

As illustrated in FIG. 7, at least one of the vent valve 41 or the suction pump 42 that form a portion of the gas-leak-detection device 40 is disposed such that the virtual-left-right-center plane Pw, the virtual-front-rear-center plane P1, or the virtual-up-down-center plane Ph is located between the gravity center 33g of the canister 33 and at least one of the gravity center 41g of the vent valve 41 or the gravity center 42g of the suction pump 42.

For example, in a case where, in the vehicle 1, the canister 33 and at least one of the vent valve 41 or the suction pump 42 that form a portion of the gas-leak-detection device 40 are disposed in the space at left of the virtual-left-right-center plane Pw, the space in front of the virtual-front-rear-center plane P1, and the space above the virtual-up-down-center plane Ph, the canister 33 is disposed such that the gravity center thereof is located in a space under the fuel tank 8b and in front of the intake system component 9a. The vent valve 41 and the suction pump 42 are disposed such that the gravity centers thereof are located in a space under the fuel tank 8b and above the engine body 7a.

The canister 33 and the suction pump 42 located furthest from the canister 33 are disposed such that each of an interval W1 between the gravity center 33g of the canister 33 and the gravity center 42g of the suction pump 42 in the front-rear direction and an interval W2 therebetween in the up-down direction is shorter than the width W of the handlebar 6 in the left-right direction. In this case, a length of the vent pipe 34 that connects the canister 33 and at least one of the vent valve 41 or the suction pump 42 is suppressed to be in a certain range.

The canister 33 and the vent valve 41 and the suction pump 42 that form the gas-leak-detection device 40 are disposed in a dispersed manner, so that the weight balance can be maintained while the spaces in the vehicle 1 in which the canister 33, the vent valve 41, and the suction pump 42 can be mounted can be efficiently used. The gas-leak-detection device 40 can suppress increase in an exhaust time of the suction pump 42 that discharges the gas G in the vent pipe 34 to the outside and can suppress reduction in detection sensitivity of the pressure sensor 43 that measures a pressure in the vent pipe 34.

<First Mounting Example of Mounting Canister and Gas-Leak-Detection Device on Vehicle>

Figure 8:
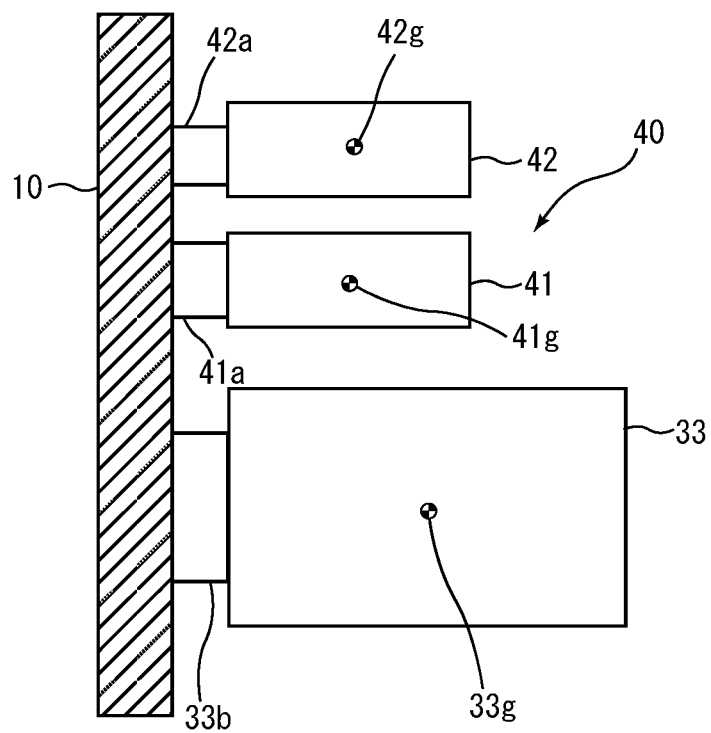
FIG. 8 is a schematic view illustrating a first mounting example of mounting a canister, a vent valve, and a suction pump on a straddled vehicle.

Next, with reference to FIG. 8, a first mounting example of mounting the canister 33 and the gas-leak-detection device 40 of the evaporative emission system 30 on the vehicle 1 will be described. FIG. 8 is a schematic view illustrating a state where, in the evaporative emission system 30, each of the canister 33 and the vent valve 41 and the suction pump 42 that form a portion of the gas-leak-detection device 40 is independently coupled to the frame 10 via a corresponding supporting member.

As illustrated in FIG. 8, the vent valve 41 is coupled to the frame 10 by the vent-valve-supporting member 41a. The suction pump 42 is coupled to the frame 10 by the suction-pump-supporting member 42a. The canister 33 is coupled to the frame 10 by the canister supporting member 33b. The canister 33, the vent valve 41, and the suction pump 42 are disposed such that the virtual-left-right-center plane Pw, the virtual-front-rear-center plane P1, or the virtual-up-down-center plane Ph is located between the gravity center 33g of the canister 33 and at least one of the gravity center 41g of the vent valve 41 or the gravity center 42g of the suction pump 42 (see FIG. 4 to FIG. 6).

The canister 33, the vent valve 41, and the suction pump 42 are individually coupled to the frame 10 by the different supporting members. Thus, the canister 33, the vent valve 41, and the suction pump 42 are independently coupled to the frame 10. As described above, the parts are coupled to the frame 10 using different supporting members, so that the parts can be efficiently disposed in different spaces selected from the plurality of spaces of the vehicle 1. The pressure sensor 43 may be integrally provided with the canister 33.

<Second Mounting Example of Mounting Canister and Gas-Leak-Detection Device on Vehicle>

Figure 9:
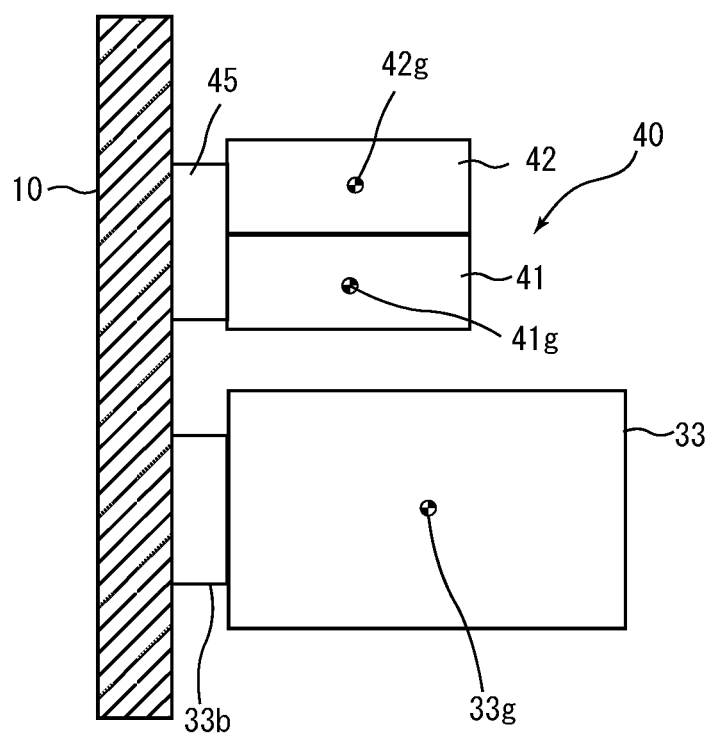
FIG. 9 is a schematic view illustrating a second mounting example of mounting a canister, a vent valve, and a suction pump on a straddled vehicle.

Next, with reference to FIG. 9, a second mounting example of mounting the canister 33 and the gas-leak-detection device 40 of the evaporative emission system 30 on the vehicle 1 will be described. FIG. 9 is a schematic view illustrating a state where, in the evaporative emission system 30, the canister 33 is coupled to the vehicle 1 via the canister supporting member 33b, and the vent valve 41 and the suction pump 42 are coupled to the frame 10 via a common supporting member 45 serving as a second common supporting member.

As illustrated in FIG. 9, the vent valve 41 and the suction pump 42 are coupled to the frame 10 in a state where the vent valve 41 and the suction pump 42 are coupled to the same common supporting member 45. The canister 33 is coupled to the frame 10 by the canister supporting member 33b. The canister 33, the vent valve 41, and the suction pump 42 are disposed such that the virtual-left-right-center plane Pw, the virtual-front-rear-center plane P1, or the virtual-up-down-center plane Ph is located between the gravity center 33g of the canister 33 and at least one of the gravity center 41g of the vent valve 41 or the gravity center 42g of the suction pump 42 (see FIG. 4 to FIG. 6).

The common supporting member 45 that supports the vent valve 41 and the suction pump 42 is a different supporting member from the canister supporting member 33b. That is, the canister 33, the vent valve 41, and the suction pump 42 are individually coupled to the frame 10 by the different supporting members. Thus, each of the canister 33, and the vent valve 41 and the suction pump 42 is supported to the frame 10 independently from each other. Accordingly, parts can be efficiently disposed in different spaces selected from the plurality of spaces of the vehicle 1. The pressure sensor 43 may be integrally provided with the canister 33.

<Third Mounting Example of Mounting Canister and Gas-Leak-Detection Device on Vehicle>

Figure 10:
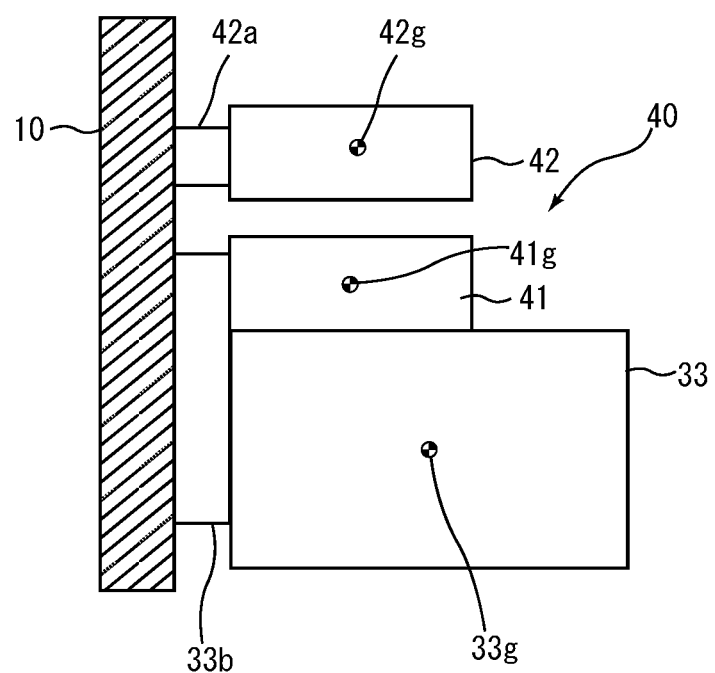
FIG. 10 is a schematic view illustrating a third mounting example of mounting a canister, a vent valve, and a suction pump on a straddled vehicle.

Next, with reference to FIG. 10, a third mounting example of mounting the canister 33 and the gas-leak-detection device 40 of the evaporative emission system 30 on the vehicle 1 will be described. FIG. 10 is a schematic view illustrating a state where, in the evaporative emission system 30, the canister 33 and the vent valve 41 are coupled to the vehicle 1 via the canister supporting member 33b and the suction pump 42 is coupled to the vehicle 1 via the suction-pump-supporting member 42a.

As illustrated in FIG. 10, the canister 33 and the vent valve 41 are coupled to the frame 10 by the same canister supporting member 33b. The suction pump 42 is coupled to the frame 10 by the suction-pump-supporting member 42a. The canister 33, the vent valve 41, and the suction pump 42 are disposed such that the virtual-left-right-center plane Pw, the virtual-front-rear-center plane P1, or the virtual-up-down-center plane Ph is located between the gravity center 33g of the canister 33 and at least one gravity center of the gravity center 41g of the vent valve 41 or the gravity center 42g of the suction pump 42 (see FIG. 4 to FIG. 6).

A single canister supporting member 33b that supports the canister 33 and the vent valve 41 is a different supporting member from the suction-pump-supporting member 42a. That is, each of the canister 33 and the vent valve 41, and the suction pump 42 is individually coupled to the frame 10 by the different supporting members. Thus, each of the vent valve 41 and the canister 33, and the suction pump 42 is coupled to the frame 10 independently from each other. Accordingly, parts can be efficiently disposed in different spaces selected from the plurality of spaces of the vehicle 1. The pressure sensor 43 may be integrally provided with the canister 33.

<Fourth Mounting Example of Mounting Canister and Gas-Leak-Detection Device on Vehicle>

Figure 11:
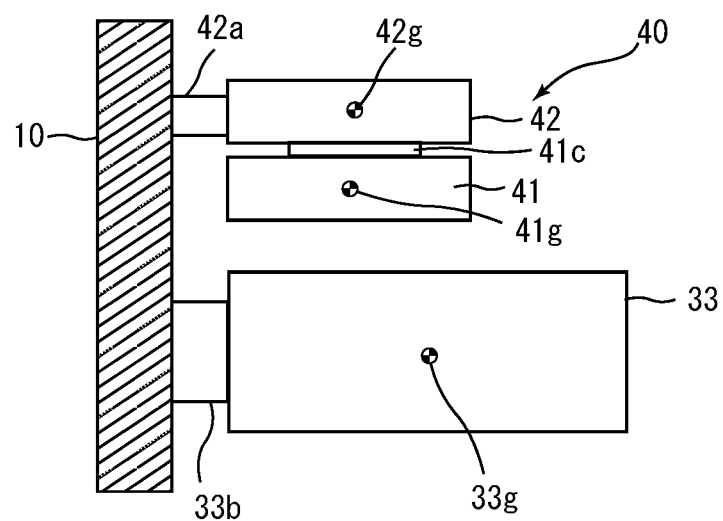
FIG. 11 is a schematic view illustrating a fourth mounting example of mounting a canister, a vent valve, and a suction pump on a straddled vehicle.

Next, with reference to FIG. 11, a fourth mounting example of mounting the canister 33 and the gas-leak-detection device 40 of the evaporative emission system 30 on the vehicle 1 will be described. FIG. 11 is a schematic view illustrating a state where, in the evaporative emission system 30, the canister 33 is coupled to the vehicle 1 via the canister supporting member 33b and the vent valve 41 and the suction pump 42 are coupled to the vehicle 1 via the suction-pump-supporting member 42a.

As illustrated in FIG. 11, the vent valve 41 is coupled to the suction pump 42 by a connection member 41c. The suction pump 42 to which the vent valve 41 is coupled is coupled to the frame 10 by the suction-pump-supporting member 42a. The canister 33 is coupled to the frame 10 by the canister supporting member 33b. The canister 33, the vent valve 41, and the suction pump 42 are disposed such that the virtual-left-right-center plane Pw, the virtual-front-rear-center plane P1, or the virtual-up-down-center plane Ph is located between the gravity center 33g of the canister 33 and at least one gravity center of the gravity center 41g of the vent valve 41 or the gravity center 42g of the suction pump 42 (see FIG. 4 to FIG. 6).

Moreover, the canister 33 and the suction pump 42 to which the vent valve 41 is coupled are individually couple to the frame 10 by different supporting members. Accordingly, each of the canister 33, and the vent valve 41 and the suction pump 42 is supported to the frame 10 independently from each other. Thus, parts can be efficiently disposed independently in different spaces selected from the plurality of spaces of the vehicle 1. The pressure sensor 43 may be integrally provided with the canister 33.

<Divided Canister>

Figure 12:
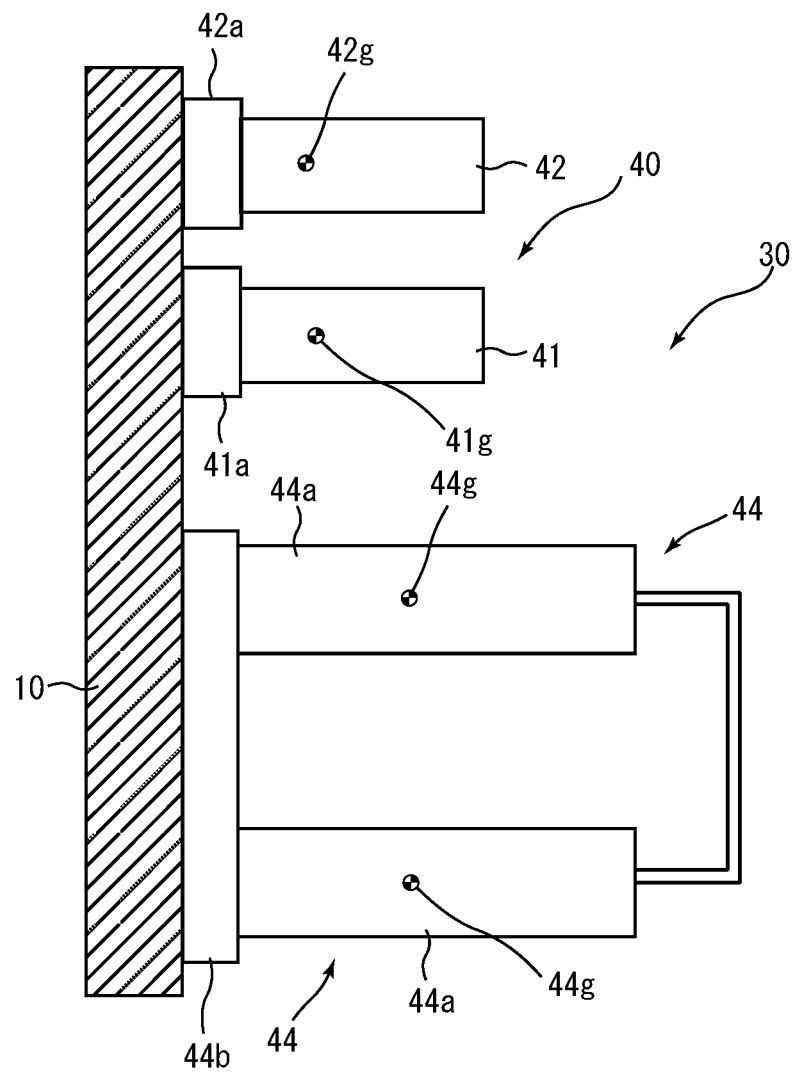
FIG. 12 is a schematic view of an evaporative emission system including divided canisters.

As illustrated in FIG. 12, the evaporative emission system 30 may include a plurality of divided canisters 44. Each of the plurality of divided canisters 44 includes the case 44a and the activated carbon that absorbs the evaporated fuel Gf. The plurality of divided canisters 44 are connected in series or in parallel in a flow of the gas G. That is, the plurality of divided canisters 44 connected in series are coupled to each other such that the gas G that has flowed in one of the divided canisters 44 flows in the other one of the divided canisters 44. The plurality of the divided canisters 44 connected in parallel are coupled to each other such that the gas G flows in each of one of the divided canisters 44 and the other one of the divided canisters 44. In this embodiment, the plurality of divided canisters 44 are connected in series.

One of the plurality of divided canisters 44 is connected to the fuel tank 8b by the first purge pipe 32. Thus, the evaporated fuel Gf in the fuel tank 8b flows in the divided canisters 44 from the first purge pipe 32. Moreover, the vent pipe 34 is connected to any one of the plurality of divided canisters 44. Thus, the gas G flows in the plurality of divided canisters 44 from the vent pipe 34. Of the plurality of divided canisters 44, the other divided canister 44 is connected to the intake pipe 9b of the engine body 7a by the second purge pipe 35. Thus, the gas Gin the plurality of divided canisters 44 is discharged to the intake pipe 9b from the second purge pipe 35 (see FIG. 3). The pressure sensor 43 may be integrated with at least one of the plurality of divided canisters 44.

At least one of the plurality of divided canisters 44 is coupled to a part forming the vehicle 1 by a supporting member 44b serving as the first supporting member. In this embodiment, each of the plurality of divided canisters 44 is coupled to the frame 10, for example, by the supporting member 44b. The vent valve 41 is coupled to the frame 10 by the vent-valve-supporting member 41a. The suction pump 42 is coupled to the frame 10 by the suction-pump-supporting member 42a. That is, the plurality of divided canisters 44, the vent valve 41, and the suction pump 42 are coupled to the frame 10 by the different supporting members.

The divided canisters 44, the vent valve 41, and the suction pump 42 are disposed such that the virtual-left-right-center plane Pw, the virtual-front-rear-center plane P1, or the virtual-up-down-center plane Ph is located between each of the gravity centers 44g of the divided canisters 44 and at least one of the gravity center 41g of the vent valve 41 or the gravity center 42g of the suction pump 42 (see FIG. 4 to FIG. 6). Accordingly, the plurality of divided canisters 44, the vent valve 41, and the suction pump 42 are individually supported to the frame 10. Thus, the parts can be efficiently disposed independently in different spaces selected from the plurality of spaces of the vehicle 1.

In the embodiment illustrated in FIG. 12, the plurality of divided canisters 44 are coupled to the frame 10 by a single supporting member 44b, but may be individually coupled to the frame 10 by different supporting members.

<First Variation of Divided Canisters>

Figure 13:
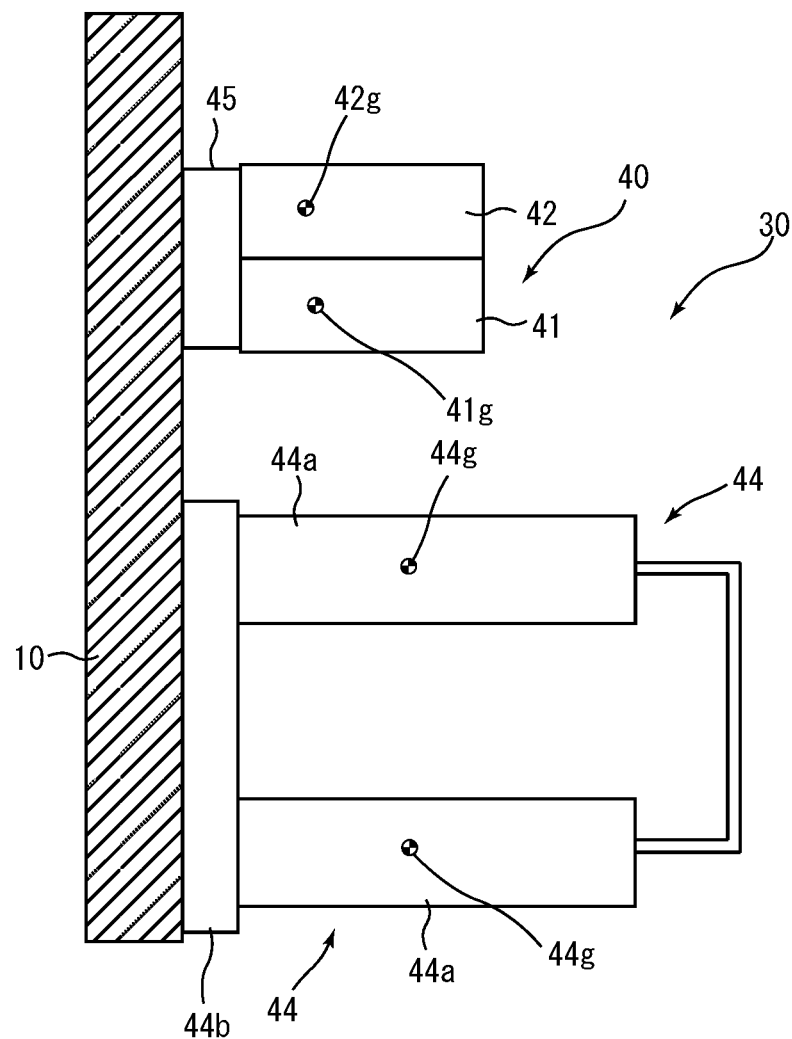
FIG. 13 is a schematic view illustrating a first variation of the evaporative emission system including the divided canisters.

Next, with reference to FIG. 13, a first variation of the divided canisters will be described. FIG. 13 is a schematic view illustrating the first variation of the evaporative emission system 30 using the divided canisters 44.

As illustrated in FIG. 13, the plurality of divided canisters 44 are coupled to the frame 10 by a single supporting member 44b. The vent valve 41 and the suction pump 42 are coupled to the frame 10 in a state where the vent valve 41 and the suction pump 42 are coupled by the common supporting member 45. The plurality of divided canisters 44, the vent valve 41, and the suction pump 42 are disposed such that the virtual-left-right-center plane Pw, the virtual-front-rear-center plane P1, or the virtual-up-down-center plane Ph is located between each of the gravity centers 44g of the divided canisters 44 and at least one of the gravity center 41g of the vent valve 41 or the gravity center 42g of the suction pump 42 (see FIG. 4 to FIG. 6).

The supporting member 44b that supports the plurality of divided canisters 44 is a different supporting member from the common supporting member 45 that supports the vent valve 41 and the suction pump 42. Thus, the divided canisters 44, the vent valve 41, and the suction pump 42 are individually coupled to the frame 10. Accordingly, the parts can be independently disposed in different spaces selected from the plurality of spaces of the vehicle 1.

As illustrated in FIG. 13, the plurality of divided canisters 44 are coupled to the frame 10 by the single supporting member 44b, but may be individually coupled to the frame 10 by different supporting members.

<Second Variation of Divided Canisters>

Figure 14:
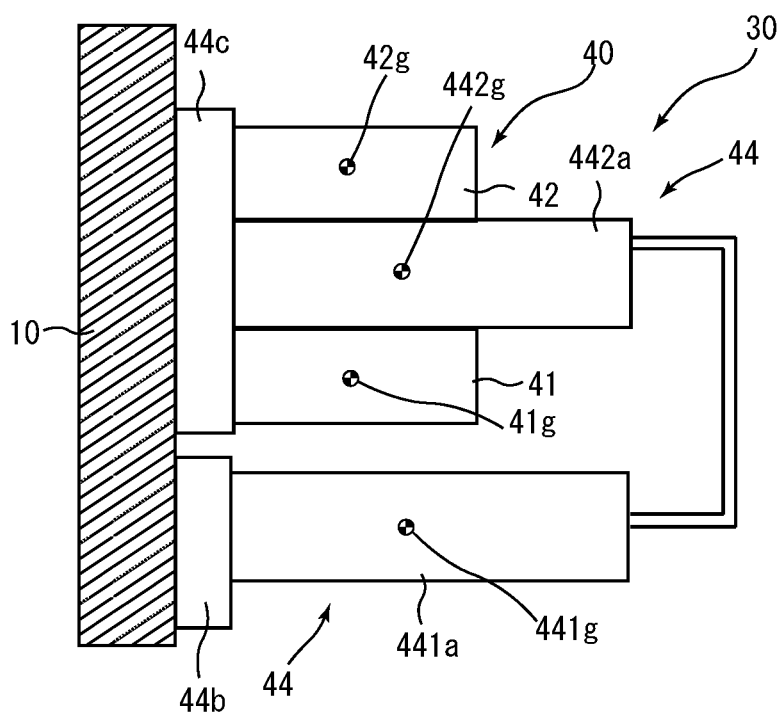
FIG. 14 is a schematic view illustrating a second variation of the evaporative emission system including the divided canisters.

Next, with reference to FIG. 14, a second variation of the divided canisters will be described. FIG. 14 is a schematic view illustrating the second variation of the evaporative emission system 30 using the divided canisters 44.

As illustrated in FIG. 14, the divided canisters 44 include a first divided canister 441a and a second divided canister 442a. The first divided canister 441a is coupled to the frame 10 by the supporting member 44b. The second divided canister 442a is coupled to the frame 10 by the supporting member 44c. The divided canisters 44 of this embodiment are coupled to the frame 10 independently from each other by the different supporting members.

The vent valve 41 and the suction pump 42 are supported by the supporting member 44c that supports the second divided canister 442a. The vent valve 41, the suction pump 42 and the second divided canister 442a are coupled to the supporting member 44c. The vent valve 41, the suction pump 42, and the second divided canister 442a are coupled to the frame 10 by the supporting member 44c.

The first divided canister 441a, the vent valve 41, and the suction pump 42 are disposed such that the virtual-left-right-center plane Pw, the virtual-front-rear-center plane P1, or the virtual-up-down-center plane Ph is located between a gravity center 441g of the first divided canister 441a and at least one of the gravity center 41g of the vent valve 41 or the gravity center 42g of the suction pump 42 (see FIG. 4 to FIG. 6). The supporting member 44b of the first divided canister 441a is a different supporting member from the supporting member 44c that supports the vent valve 41, the suction pump 42, and the second divided canister 442a. Thus, the first divided canister 441a, the second divided canister 442a, the vent valve 41, and the suction pump 42 are individually coupled to the frame 10. Accordingly, the parts can be independently disposed in different spaces selected from the plurality of spaces of the vehicle 1.

<Third Variation of Divided Canisters>

Figure 15:
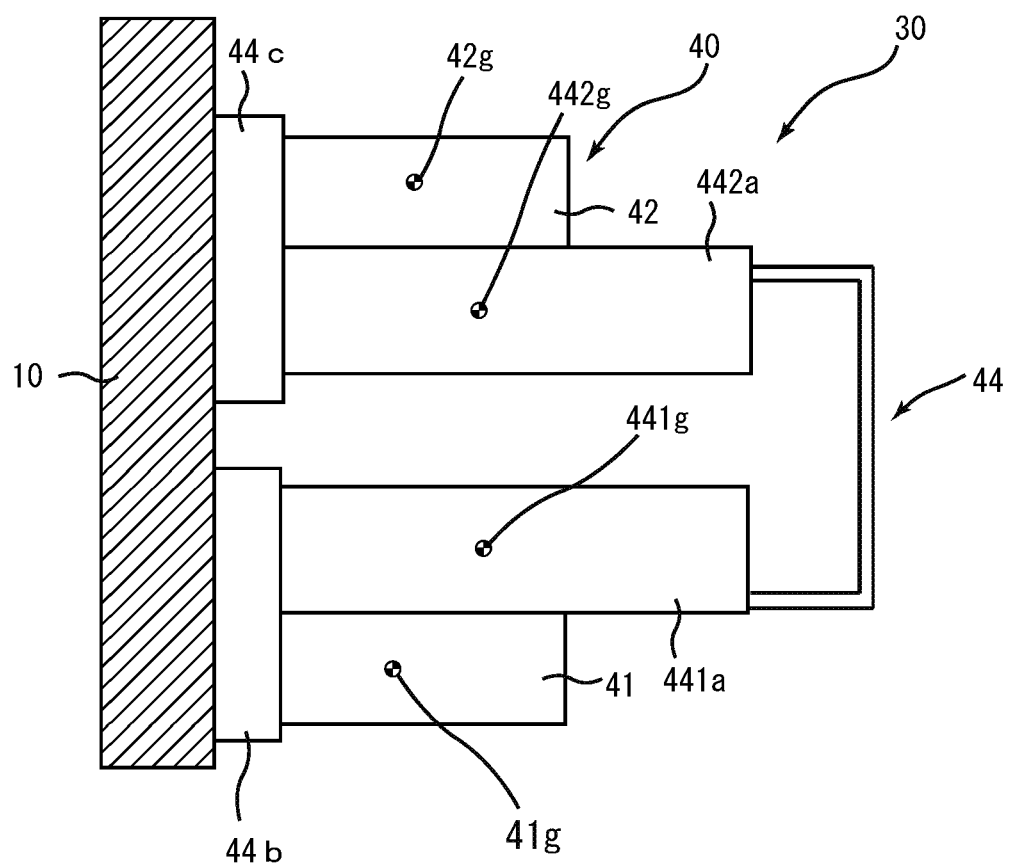
FIG. 15 is a schematic view illustrating a third variation of the evaporative emission system including the divided canisters.

Next, with reference to FIG. 15, a third variation of the divided canisters will be described. FIG. 15 is a schematic view illustrating the third variation of the evaporative emission system 30 using the divided canisters 44.

As illustrated in FIG. 15, the divided canisters 44 include the first divided canister 441a and the second divided canister 442a. The first divided canister 441a is coupled to the frame 10 by the supporting member 44b. The second divided canister 442a is coupled to the frame 10 by the supporting member 44c. The divided canisters 44 of this embodiment are coupled to the frame 10 independently from each other by the different supporting members.

The vent valve 41 is supported by the supporting member 44b that supports the first divided canister 441a. The vent valve 41 and the first divided canister 441a are coupled to the frame 10 by the supporting member 44b.

The suction pump 42 is supported by the supporting member 44c that supports the second divided canister 442a. The suction pump 42 and the second divided canister 442a are coupled to the frame 10 by the supporting member 44c.

The vent valve 41 and the second divided canister 442a are disposed such that the virtual-left-right-center plane Pw, the virtual-front-rear-center plane P1, or the virtual-up-down-center plane Ph is located between a gravity center 442g of the second divided canister 442a and the gravity center 41g of the vent valve 41 (see FIG. 4 to FIG. 6). Similarly, the suction pump 42 and the first divided canister 441a are disposed such that the virtual-left-right-center plane Pw, the virtual-front-rear-center plane P1, or the virtual-up-down-center plane Ph is located between the gravity center 441g of the first divided canister 441a and the gravity center 42g of the suction pump 42.

The supporting member 44b that supports the vent valve 41 and the first divided canister 441a is a different supporting member from the supporting member 44c that supports the suction pump 42 and the second divided canister 442a. Thus, a group consisting of the first divided canister 441a and the vent valve 41 and a group consisting of the second divided canister 442a and the suction pump 42 are coupled to the frame 10 individually from each other. Accordingly, the parts can be independently disposed in different spaces selected from the plurality of spaces of the vehicle 1.

Second Embodiment

<Configuration of Gas-Leak-Detection Device of Forced-Negative-Pressure Type>

Figure 16:
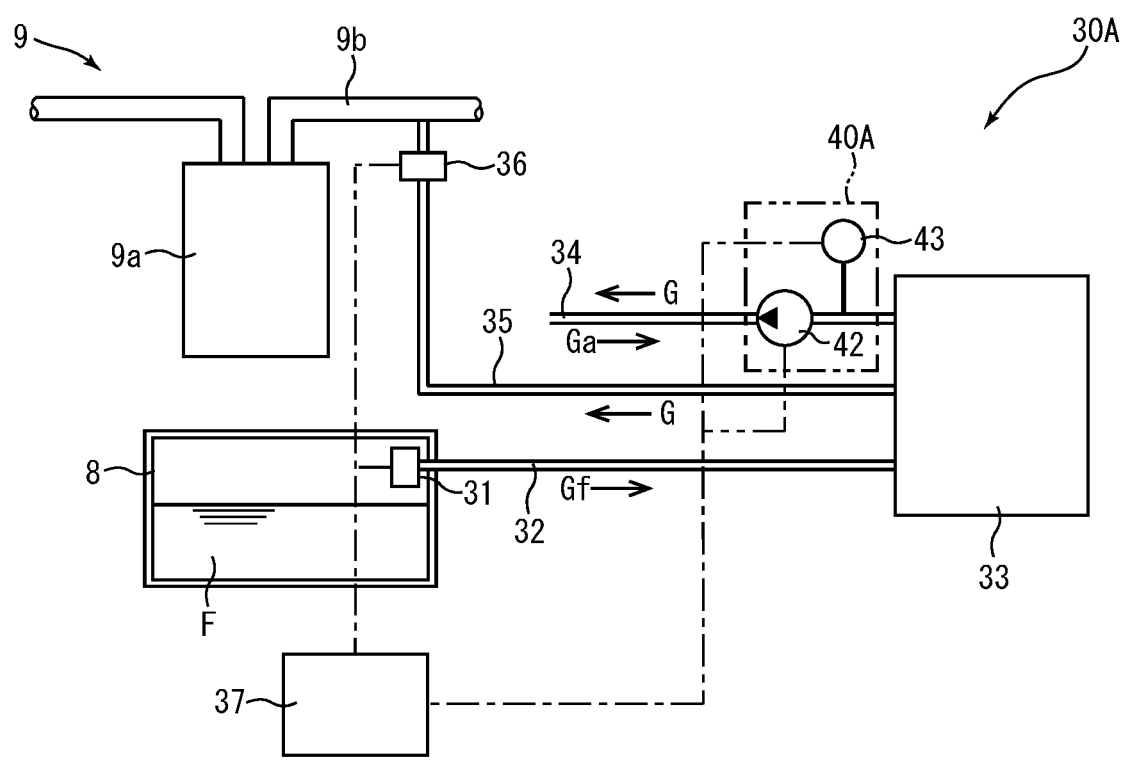
FIG. 16 is an outline block diagram of an evaporative emission system according to a second embodiment of the present teaching.

Next, with reference to FIG. 16, a gas-leak-detection device 40A of an evaporative emission system 30A that is a second embodiment of the evaporative emission system mounted on the vehicle 1 of the present teaching will be described. FIG. 16 is an outline block diagram of the evaporative emission system 30A mounted on the vehicle 1 according to the embodiment. Note that, in the following embodiment, specific description of similar points to those in the embodiment already described will be omitted and only a portion which differs from the already described embodiment will be described in detail.

As illustrated in FIG. 16, the evaporative emission system 30A includes the gas-leak-detection device 40A. The gas-leak-detection device 40A is a gas-leak-detection device of a forced-negative-pressure type that forcibly makes a pressure in a gas passage in the evaporative emission system 30A negative by the suction pump 42. The gas-leak-detection device 40A includes the suction pump 42 and the pressure sensor 43 that are parts used for performing an inspection for a leak of gas G from the evaporative emission system 30A.

In this embodiment, the gravity center of the canister 33 is disposed so as to be separated from the gravity center of the suction pump 42 at least in one direction of the left-right direction, the front-rear direction, or the up-down direction of the vehicle 1, and the suction pump 42 and the canister 33 are supported independently from each other.

The suction pump 42 is provided in the vent pipe 34. The suction pump 42 can suck the gas G in the gas passage via the vent pipe 34. In a case where the suction pump 42 is stopped, the gas passage is in a state where the outside air Ga that has passed through the suction pump 42 flows therein. In a case where the suction pump 42 is in operation, the gas passage is in a state where the outside air Ga does not pass through the suction pump 42 and does not flow therein, because the gas G in the gas passage is discharged to the atmosphere by the suction pump 42. Accordingly, the evaporative emission system 30A can introduce the outside air Ga to the gas passage including the canister 33 by stopping the suction pump 42. That is, the suction pump 42 can switch the vent pipe 34 between a closed state where the outside air Ga does not flow in the canister 33 and an open state where the outside air Ga flows in the canister 33.

Similar to the first embodiment, the evaporative emission system 30A may include the divided canisters 44.

<Detection of Leak from Evaporative Emission System>

In a case of detecting a leak of the gas G from the evaporative emission system 30A, the controller 37 switches the shut-off valve 31 and the purge control valve 36 to the closed state. Next, the controller 37 causes the suction pump 42 to suck the gas G in the gas passage and causes the gas G to be discharged to the atmosphere from the vent pipe 34. At this time, the outside gas Ga does not flow in the gas passage from the vent pipe 34. The controller 37 causes the pressure sensor 43 to measure a pressure in the gas passage. If a measured value of the pressure sensor 43 is a reference value or more, the controller 37 determines that there is a probability that the gas G leaks from the gas passage.

The gas-leak-detection device 40A is disposed such that the gravity center of the canister 33 is separated from the gravity center of the suction pump 42 in at least one direction of the left-right direction, the front-rear direction, or the up-down direction of the vehicle 1. Therefore, also in the configuration of the second embodiment, the gas-leak-detection device 40A can be mounted on the vehicle 1 in consideration of use efficiency of the spaces in the vehicle 1 and the weight balance.

Third Embodiment

<Configuration of Gas-Leak-Detection Device of Natural-Negative-Pressure Type>

Figure 17:
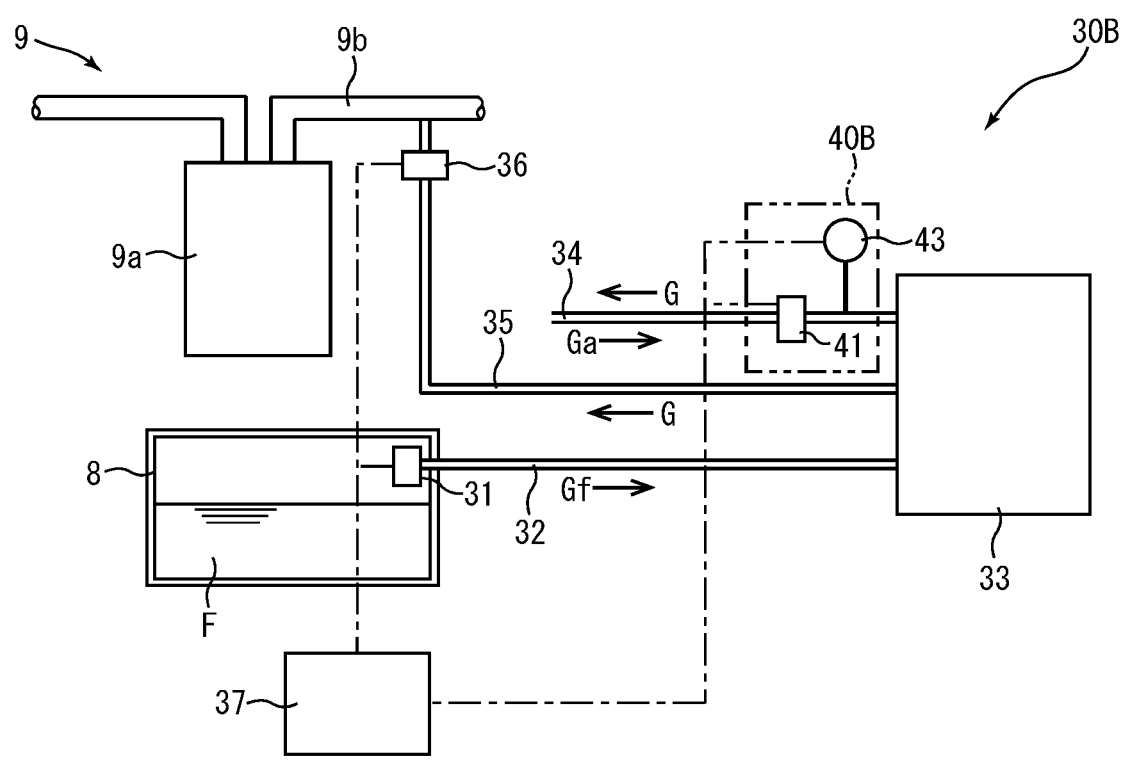
FIG. 17 is an outline block diagram of an evaporative emission system according to a third embodiment of the present teaching.

Next, with reference to FIG. 17, a gas-leak-detection device 40B of an evaporative emission system 30B that is a third embodiment of the evaporative emission system mounted on the vehicle 1 of the present teaching will be described. FIG. 17 is an outline block diagram of the evaporative emission system 30B mounted on the vehicle 1 according to the embodiment.

As illustrated in FIG. 17, the evaporative emission system 30B includes the gas-leak-detection device 40B. The gas-leak-detection device 40B is a gas-leak-detection device of a natural-negative-pressure type that makes a pressure in a gas passage of the evaporative emission system 30B negative using thermal expansion and thermal contraction of the evaporated fuel Gf in the fuel tank 8b. The gas-leak-detection device 40B incudes the vent valve 41 and the pressure sensor 43 that are parts used for performing an inspection for a leak of gas G from the evaporative emission system 30B.

In this embodiment, the gravity center 33g of the canister 33 is disposed so as to be separated from the gravity center 41g of the vent valve 41 in at least one direction of the left-right direction, the front-rear direction, or the up-down direction of the vehicle 1, and the vent valve 41 and the canister 33 are supported independently from each other.

Similar to the first embodiment, the evaporative emission system 30B may include the divided canisters 44.

<Detection of Leak from Evaporative Emission System>

In a case of detecting a leak of the gas G from the evaporative emission system 30B, the controller 37 switches the shut-off valve 31 to the open state. Furthermore, the controller 37 switches the vent valve 41 and the purge control valve 36 to the closed state. Next, the controller 37 causes the pressure sensor 43 to measure a pressure in the gas passage. Along with the measurement of the pressure in the gas passage, the controller 37 causes an unillustrated thermometer to measure temperature in the fuel tank 8b. The controller 37 determines whether there is a probability that the gas G leaks from the gas passage due to fluctuation of the temperature of the fuel tank 8b and fluctuation of the pressure in the gas passage.

The gas-leak-detection device 40B is disposed such that the gravity center of the canister 33 is separated from the gravity center of the vent valve 41 in at least one direction of the left-right direction, the front-rear direction, or the up-down direction of the vehicle 1. Therefore, also in the configuration of the third embodiment, the gas-leak-detection device 40B can be mounted on the vehicle 1 in consideration of use efficiency of the spaces of the vehicle 1 and the weight balance.

Other Embodiments

In the first embodiment described above, the vent valve 41 and the suction pump 42 are supported by the vehicle 1 separately from the canister 33. However, at least one of the vent valve 41 or the suction pump 42 may be supported by the vehicle 1 independently from the canister 33.

In the first embodiment described above, the canister 33 or the divided canisters 44 are coupled to a part forming the vehicle 1. In this case, a direction in which the canister 33 or each of the divided canisters 44 faces and a coupling position in the canister 33 or each of the divided canisters 44 with respect to the vehicle 1 are not limited.

In the first embodiment described above, the canister includes the two divided canisters 44. However, the canister may have three or more divided canisters. The three or more divided canisters may include divided canisters connected in series and divided canisters connected in parallel.

In the above-described third mounting example of mounting the canister and the gas-leak-detection device on the vehicle, the canister 33 and the vent valve 41 are coupled by the canister supporting member 33b. However, instead of the vent valve 41, the suction pump 42 and the canister 33 may be coupled by the canister supporting member 33b. Furthermore, in the above-described third mounting example of mounting the canister and the gas-leak-detection device on the vehicle, the vent valve 41 is coupled to the canister 33 by the canister supporting member 33b. However, the vent valve 41 may be coupled to the canister 33 via a connection member. Similarly, the suction pump 42 may be coupled to the canister 33 via a connection member. The vent valve 41 and the canister 33 may be directly coupled without any connection member.

In the above-described first variation of the divided canisters, the vent valve 41 and the suction pump 42 are coupled by the common supporting member 45. However, the vent valve 41 and the suction pump 42 may be coupled by a connection member, and the vent valve 41 and the suction pump 42 may be coupled to the frame 10 by a supporting member. The vent valve 41 and the suction pump 42 may be directly integrated without any connection member.

In the above-described second variation of the divided canisters, the vent valve 41, the suction pump 42 and the second divided canister 442a are coupled by the supporting member 44c. However, the vent valve 41, the suction pump 42 and the second divided canister 442a may be individually coupled to each other by a corresponding connection member, and the vent valve 41, the suction pump 42 and the second divided canister 442a may be coupled to the frame 10 by the supporting member 44c. The vent valve 41 and the suction pump 42 may be directly coupled to the second divided canister 442a without any connection member.

In the above-described third variation of the divided canisters, the vent valve 41 and the first divided canister 441a are coupled by the supporting member 44b, and the suction pump 42 and the second divided canister 442a are coupled by the supporting member 44c. However, the vent valve 41 and the first divided canister 441a may be coupled by a connection member, and the vent valve 41 and the first divided canister 441a may be coupled to the frame 10 by the supporting member 44b. Similarly, the suction pump 42 and the second divided canister 442a may be coupled by a connection member, and the suction pump 42 and the second divided canister 442a may be coupled to the frame 10 by the supporting member 44c. The vent valve 41 and the first divided canister 441a may be directly coupled without any connection member, and the vent valve 41 and the first divided canister 441a may be coupled to the frame 10 by the supporting member 44b. Similarly, the suction pump 42 and the second divided canister 442a may be directly coupled without any connection member, and the suction pump 42 and the second divided canister 442a may by coupled to the frame 10 by the supporting member 44c.

In vehicle 1, in a case where the canister 33 and at least one of the vent valve 41 or the suction pump 42 that form a portion of the gas-leak-detection device 40 are disposed in the space at left of the virtual-left-right-center plane Pw, the space in front of the virtual-front-rear-center plane P1, and the space above the virtual-up-down-center plane Ph, the canister 33 is disposed such that the gravity center thereof is located in a space under the fuel tank 8b and in front of the intake system component 9a. The vent valve 41 and the suction pump 42 are disposed such that the gravity centers thereof are located in a space under the fuel tank 8b and above the engine body 7a. However, in a case where the canister 33 and at least one of the vent valve 41 or the suction pump 42 are disposed, each of the canister 33 and at least one of the vent valve 41 or the suction pump 42 may be disposed in a dispersed manner in a space between corresponding ones of the vehicle body cover 5, the engine body 7a, the intake system component 9a, the fuel system component 8a, or the storage box 20.

Embodiments of the present teaching have been described above, but the above-described embodiments are merely illustrative examples of preferred embodiments of the present teaching. Therefore, the present teaching is not limited to the above-described embodiments and the above-described embodiments can be appropriately modified and implemented without departing from the gist of the invention.

REFERENCE SIGNS LIST

1 Vehicle
2 Vehicle body
3 Front wheel
4 Rear Wheel
5 Vehicle body cover
6 Handlebar
7 Power unit
7a Engine body
8 Fuel system
8a Fuel system component
8b Fuel tank
9 Intake system
9a Intake system component
9b Intake pipe
10 Frame
11 Head pipe
12 Main frame
13 Seat rail
14 Seat
15 Storage box
30, 30A, 30B Evaporative emission system
31 Shut-off valve
32 First purge pipe
33 Canister
33g Gravity center of canister
33a Case
33b Canister supporting member
34 Vent pipe
35 Second purge pipe
36 Purge control valve
37 Controller
40 Gas-leak-detection device
41 Vent valve
41g Gravity center of vent valve
41a Vent valve supporting member
42 Suction pump
42a Suction pump supporting member
42g Gravity center of suction pump
43 Pressure sensor
44 Divided canister
45 Common supporting member

The invention claimed is:

1. A straddled vehicle comprising:
a front wheel;
a rear wheel;
a handlebar configured to steer the front wheel;
an engine body configured to drive the front wheel or the rear wheel, the engine body having an intake passage;
a fuel tank configured to store fuel for the engine body; and
an evaporative emission system having a canister and a gas passage that includes an outside-air-introduction passage, the evaporative emission system being configured to
collect evaporated fuel generated in the fuel tank by the canister,
introduce outside air to the canister from the outside-air-introduction passage through which the outside air is introduced, and
discharge the collected evaporated fuel and the introduced outside air to the intake passage of the engine body from the canister, wherein
the straddled vehicle is configured such that a width of the handlebar in a left-right direction of the straddled vehicle is smaller than both a length between a front end of the front wheel and a rear end of the rear wheel in a front-rear direction of the straddled vehicle, and a height between an upper end of the handlebar and a lower end of the front wheel in an up-down direction of the straddled vehicle,
the evaporative emission system includes at least one of
an electric vent valve configured to switch between
a closed state in which the outside-air-introduction passage is closed, and
an open state in which the outside-air-introduction passage is opened, or
an electric suction pump configured to suck gas in the gas passage, the gas including at least one of the evaporated fuel or the outside air, and flowing in the evaporative emission system through the gas passage; and
the canister and at least one of the vent valve or the suction pump are disposed such that
at least one of
a virtual-left-right-center plane, which is a virtual plane that includes a center of the handlebar in the left-right direction and is perpendicular to the left-right direction,
a virtual-front-rear-center plane, which is a virtual plane that includes a center between the front end of the front wheel and the rear end of the rear wheel in the front-rear direction and is perpendicular to the front-rear direction, or
a virtual-up-down-center plane, which is a virtual plane that includes a center between the upper end of the handlebar and the lower end of the front wheel in the up-down direction and is perpendicular to the up-down direction in the straddled vehicle,
is located between a gravity center of the canister and at least one of a gravity center of the vent valve, or a gravity center of the suction pump, or
the canister and at least one of the vent valve or the suction pump are located such that each of intervals between gravity centers in the left-right direction, the front-rear direction, and the up-down direction is shorter than the width of the handlebar in the left-right direction.

2. The straddled vehicle according to claim 1, wherein the canister is supported by a first supporting member, and said at least one of the vent valve or the suction pump is supported by a second supporting member that is different from the first supporting member.

3. The straddled vehicle according to claim 1, wherein the evaporative emission system further includes a pressure sensor configured to measure a pressure in the gas passage, and the evaporative emission system is configured to:
- in a case where the evaporative emission system includes the vent valve, measure the pressure in the gas passage by the pressure sensor in a state where the outside-air-introduction passage is closed by the vent valve,
- in a case where the evaporative emission system includes the suction pump, and the suction pump is provided in the outside-air-introduction passage that is a portion of the gas passage, suck the gas in the gas passage by the suction pump and measure the pressure in the gas passage by the pressure sensor, and
- in a case where the evaporative emission system includes both the vent valve and the suction pump, suck the gas in the gas passage by the suction pump, measure the pressure in the gas passage by the pressure sensor, and detect a leak of the gas from the evaporative emission system in a state where the outside-air-introduction passage is closed by the vent valve.

4. The straddled vehicle according to claim 1, wherein the canister includes a plurality of divided canisters connected in series or in parallel, and
at least one of the plurality of divided canisters and said at least one of the vent valve or the suction pump are disposed such that
- at least one of the virtual-left-right-center plane, the virtual-front-rear-center plane, or the virtual-up-down-center plane is located between at least one of gravity centers of the divided canisters and at least one of a gravity center of the vent valve or a gravity center of the suction pump, or
- at least one of the plurality of divided canisters and at least one of the vent valve or the suction pump are located such that each of intervals between the gravity centers in the left-right direction, the front-rear direction, and the up-down direction is shorter than the width of the handlebar in the left-right direction.

* * * * *